(12) United States Patent
Tucci

(10) Patent No.: US 7,620,672 B2
(45) Date of Patent: Nov. 17, 2009

(54) METHOD FOR PERFORMING CLASSICAL BAYESIAN NET CALCULATIONS USING A QUANTUM COMPUTER

(76) Inventor: Robert R. Tucci, P.O. Box 226, Bedford, MA (US) 01730

( * ) Notice: Subject to any disclaimer, the term of this patent is extended or adjusted under 35 U.S.C. 154(b) by 930 days.

(21) Appl. No.: 10/852,328

(22) Filed: May 24, 2004

(65) Prior Publication Data

US 2005/0262179 A1    Nov. 24, 2005

(51) Int. Cl.
    *G06F 1/16* (2006.01)
(52) U.S. Cl. ..................... 708/100
(58) Field of Classification Search ................. 708/100
    See application file for complete search history.

(56) References Cited

U.S. PATENT DOCUMENTS

| | | | |
|---|---|---|---|
| 5,787,236 A | 7/1998 | Tucci | |
| 6,317,766 B1 | 11/2001 | Grover | |
| 6,456,994 B1 | 9/2002 | Tucci | |
| 6,563,310 B2 * | 5/2003 | Zagoskin | ............ 324/248 |
| 6,675,154 B2 | 1/2004 | Jaeger | |

OTHER PUBLICATIONS

Lov K. Grover, ArXiv eprint quant-ph/9605043, all ArXiv Eprints available at www.arxiv.org.
M. Nielsen, I. Chuang, "Quantum Computation and Quantum Information", (Cambridge University Press, 2000).
J. Gruska, "Quantum Computing", (Osborne McGraw-Hill, 1999).
Finn V. Jensen, "Bayesian Networks and Decision Graphs" (Springer Verlag, 2001).
Judea Pearl, "Probabilistic Reasoning in Intelligent Systems: Networks of Plausible Inference" (Morgan Kaufmann, Palo Alto, 1988).
R.R. Tucci, "Quantum Information Theory— A Quantum Bayesian Nets Perspective", ArXiv eprint quant-ph/9909039.
T. Toffoli, "Automata, Languages and Programming, 7th Coll." (Springer Verlag, 1980) p. 632.
E. Fredkin, T. Toffoli, Int. Jour. of Th. Phys. (1982) vol. 21, p. 219.
A. Barenco, C.H. Bennett, R. Cleve, D.P. DiVincenzo, N. Margolus, P. Shor, T. Sleator, J.H. Smolin, H. Weinfurter, ArXiv eprint quant-ph/9503016.
R.R. Tucci, "A Rudimentary Quantum Compiler(2cnd ed.)", ArXiv eprint quant-ph/9902062.

(Continued)

*Primary Examiner*—Tan V Mai

(57) ABSTRACT

The invention involves a classical computer that runs a special computer program. The program takes as input an initial data-set that contains probabilistic information and returns as output a sequence of elementary operations (SEO). The initial data-set helps determine a classical Bayesian (CB) net. A program called "Q-Embedder" embeds the CB net within a quantum Bayesian (QB) net. A program called "Qubiter" (a quantum compiler) then translates the QB net into an equivalent SEO. The SEO outputted by the classical computer can be used to manipulate an array of qubits in a quantum computer. Application of the SEO to the array, followed by a measurement of the array, yields the value of certain conditional probabilities that we wish to know. The main goal of the invention is to provide a method for performing classical Bayesian net calculations on a quantum computer. Such calculations can be done on a classical computer; the hope is that they can be done much faster on a quantum computer.

28 Claims, 16 Drawing Sheets

$$Q_1 = \begin{pmatrix} A_1[no] \\ A_1[si] \end{pmatrix}$$

$$Q_2 = \begin{pmatrix} A_2[no|no] & A_2[no|si] \\ A_2[si|no] & A_2[si|si] \end{pmatrix}$$

$$Q_3 = \begin{pmatrix} A_3[no|no] & A_3[no|si] \\ A_3[si|no] & A_3[si|si] \end{pmatrix}$$

$$Q_4 = \begin{pmatrix} A_4[no|no,no] & A_4[no|no,si] & A_4[no|si,no] & A_4[no|si,si] \\ A_4[si|no,no] & A_4[si|no,si] & A_4[si|si,no] & A_4[si|si,si] \end{pmatrix}$$

OTHER PUBLICATIONS

R.R. Tucci, "How to Compile a Quantum Bayesian Net", ArXiv eprint quant-ph/9805016.

R.R. Tucci, "Quantum Computer as an Inference Engine", ArXiv eprint quant-ph/0004028 Version 1, submitted on Apr. 6, 2000.

R.R. Tucci, "Quantum Computer as a Probabilistic Inference Engine", ArXiv eprint quant-ph/0004028 Version 2, submitted on Apr. 19, 2004.

B. Noble and J.W. Daniels, "Applied Linear Algebra", Third Edition (Prentice Hall, 1988).

Lov K. Grover, ArXiv eprint quant-ph/9605043, all ArXiv Eprints available at www.arxiv.org, 1966.

R.R. Tucci, "Quantum Information Theory—A Quantum Bayesian Nets Perspective", ArXiv eprint quant-ph/9909039, 1999.

A. Barenco, C.H. Bennett, R. Cleve, D.P. DiVincenzo, N. Margolus, P. Shor, T. Sleator, J.H. Smolin, H. Weinfurter, ArXiv eprint quant-ph/9503016, 1999.

R.R. Tucci, "A Rudimentary Quantum Compiler(2cnd ed.)", ArXiv eprint quant-ph/9902062, 1999.

R.R. Tucci, "How to Compile a Quantum Bayesian Net", ArXiv eprint quant-ph/9805016.

* cited by examiner $$Q_1 = \begin{pmatrix} A_1[no] \\ A_1[si] \end{pmatrix}$$

$$Q_2 = \begin{pmatrix} A_2[no|no] & A_2[no|si] \\ A_2[si|no] & A_2[si|si] \end{pmatrix}$$

$$Q_3 = \begin{pmatrix} A_3[no|no] & A_3[no|si] \\ A_3[si|no] & A_3[si|si] \end{pmatrix}$$

$$Q_4 = \begin{pmatrix} A_4[no|no,no] & A_4[no|no,si] & A_4[no|si,no] & A_4[no|si,si] \\ A_4[si|no,no] & A_4[si|no,si] & A_4[si|si,no] & A_4[si|si,si] \end{pmatrix}$$

Figure 2

|     | 00 | 01 | 02 | 03 | 10 | 11 | 12 | 13 | 20 | 21 | 22 | 23 |
|-----|----|----|----|----|----|----|----|----|----|----|----|----|
| 00  |    |    |    |    |    |    |    |    |    |    |    |    |
| 01  | $\sqrt{P(0\|0)}\xi^0$ |  |  |  | $\sqrt{P(0\|1)}\xi^1$ |  |  |  | $\sqrt{P(0\|2)}\xi^2$ |  |  |  |
| 02  |    |    |    |    |    |    |    |    |    |    |    |    |
| 10  |    |    |    |    |    |    |    |    |    |    |    |    |
| 11  | $\sqrt{P(1\|0)}\xi^0$ |  |  |  | $\sqrt{P(1\|1)}\xi^1$ |  |  |  | $\sqrt{P(1\|2)}\xi^2$ |  |  |  |
| 12  |    |    |    |    |    |    |    |    |    |    |    |    |
| 20  |    |    |    |    |    |    |    |    |    |    |    |    |
| 21  | $\sqrt{P(2\|0)}\xi^0$ |  |  |  | $\sqrt{P(2\|1)}\xi^1$ |  |  |  | $\sqrt{P(2\|2)}\xi^2$ |  |  |  |
| 22  |    |    |    |    |    |    |    |    |    |    |    |    |
| 30  |    |    |    |    |    |    |    |    |    |    |    |    |
| 31  | $\sqrt{P(3\|0)}\xi^0$ |  |  |  | $\sqrt{P(3\|1)}\xi^1$ |  |  |  | $\sqrt{P(3\|2)}\xi^2$ |  |  |  |
| 32  |    |    |    |    |    |    |    |    |    |    |    |    |

Axes: y $\tilde{x}$ (down), x $\tilde{y}$ (right)

| nodes | states | probabilities |
|---|---|---|
| $\underline{a}$ | $a \in S_{\underline{a}}$ | $P(a)$ |
| $\underline{b}$ | $b \in S_{\underline{b}}$ | $P(b)$ |
| $\underline{c}$ | $c \in S_{\underline{c}}$ | $P(c|x)$ |
| $\underline{d}$ | $d \in S_{\underline{d}}$ | $P(d|x)$ |
| $\underline{x}$ | $x \in S_{\underline{x}}$ | $P(x|a,b)$ |

Figure 4

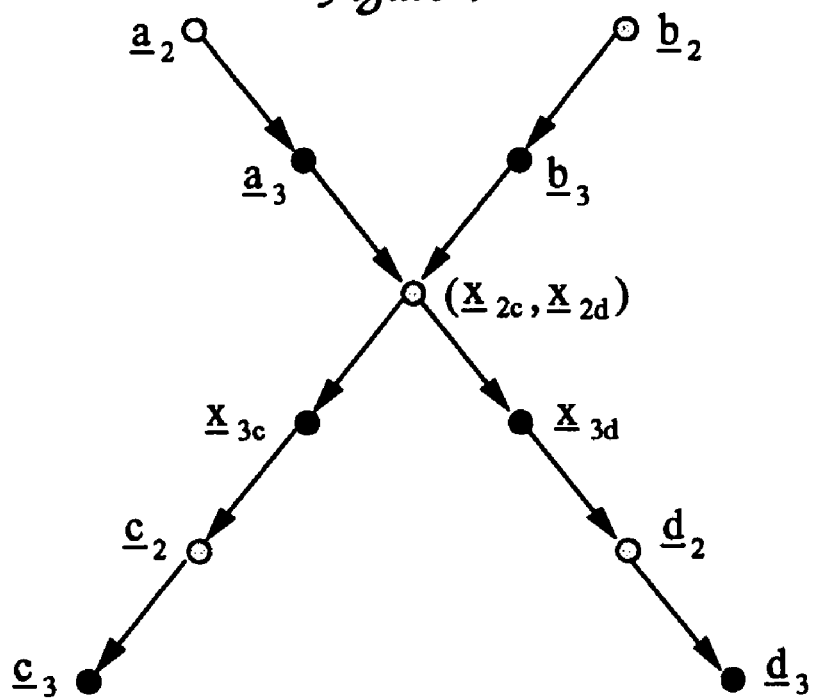

| nodes | states | probabilities |
|---|---|---|
| $\underline{a}_2$ | $a_2 \in S_{\underline{a}}$ | $P_{\underline{a}}(a_2)$ |
| $\underline{a}_3$ | $a_3 \in S_{\underline{a}}$ | $\delta(a_3, a_2)$ |
| $\underline{b}_2$ | $b_2 \in S_{\underline{b}}$ | $P_{\underline{b}}(b_2)$ |
| $\underline{b}_3$ | $b_3 \in S_{\underline{b}}$ | $\delta(b_3, b_2)$ |
| $\underline{c}_2$ | $c_2 \in S_{\underline{c}}$ | $P_{\underline{c}|\underline{x}}(c_2|x_{3c})$ |
| $\underline{c}_3$ | $c_3 \in S_{\underline{c}}$ | $\delta(c_3, c_2)$ |
| $\underline{d}_2$ | $d_2 \in S_{\underline{d}}$ | $P_{\underline{d}|\underline{x}}(d_2|x_{3d})$ |
| $\underline{d}_3$ | $d_3 \in S_{\underline{d}}$ | $\delta(d_3, d_2)$ |
| $(\underline{x}_{2c}, \underline{x}_{2d})$ | $(x_{2c}, x_{2d}) \in S_{\underline{x}}^2$ | $P_{\underline{x}|\underline{a},\underline{b}}(x_{2c}|a_3, b_3)\delta(x_{2d}, x_{2c})$ |
| $\underline{x}_{3c}$ | $x_{3c} \in S_{\underline{x}}$ | $\delta(x_{3c}, x_{2c})$ |
| $\underline{x}_{3d}$ | $x_{3d} \in S_{\underline{x}}$ | $\delta(x_{3d}, x_{2d})$ |

Figure 6

| nodes | states | amplitudes |
|---|---|---|
| $\underline{a}_1$ | $a_1 \in S_{\underline{a}}$ | $\delta(a_1, 0)$ |
| $\underline{a}_2$ | $a_2 \in S_{\underline{a}}$ | $A(a_2\|a_1 = 0) = \sqrt{P_{\underline{a}}(a_2)}$ |
| $\underline{a}_3$ | $a_3 \in S_{\underline{a}}$ | $\delta(a_3, a_2)$ |
| $(\underline{a}_4, \underline{b}_4, \underline{x}_{2c}, \underline{x}_{2d})$ | $(a_4, b_4, x_{2c}, x_{2d}) \in S_{\underline{a},\underline{b},\underline{x},\underline{x}}$ | $A(a_4, b_4, x_{2c}, x_{2d}\|a_3, b_3, x_{1c} = 0, x_{1d} = 0) =$ $\sqrt{P_{\underline{x}\|\underline{a},\underline{b}}(x_{2c}\|a_3, b_3)}\delta(a_4, a_3)\delta(b_4, b_3)\delta(x_{2d}, x_{2c})$ |
| $\underline{a}_5$ | $a_5 \in S_{\underline{a}}$ | $\delta(a_5, a_4)$ |
| $\underline{b}_1$ | $b_1 \in S_{\underline{b}}$ | $\delta(b_1, 0)$ |
| $\underline{b}_2$ | $b_2 \in S_{\underline{b}}$ | $A(b_2\|b_1 = 0) = \sqrt{P_{\underline{b}}(b_2)}$ |
| $\underline{b}_3$ | $b_3 \in S_{\underline{b}}$ | $\delta(b_3, b_2)$ |
| $\underline{b}_5$ | $b_5 \in S_{\underline{b}}$ | $\delta(b_5, b_4)$ |
| $\underline{c}_1$ | $c_1 \in S_{\underline{c}}$ | $\delta(c_1, 0)$ |
| $(\underline{c}_2, \underline{x}_{4c})$ | $(c_2, x_{4c}) \in S_{\underline{c},\underline{x}}$ | $A(c_2, x_{4c}\|c_1 = 0, x_{3c}) =$ $\sqrt{P_{\underline{c}\|\underline{x}}(c_2\|x_{3c})}\delta(x_{4c}, x_{3c})$ |
| $\underline{c}_3$ | $c_3 \in S_{\underline{c}}$ | $\delta(c_3, c_2)$ |
| $\underline{d}_1$ | $d_1 \in S_{\underline{d}}$ | $\delta(d_1, 0)$ |
| $(\underline{d}_2, \underline{x}_{4d})$ | $(d_2, x_{4d}) \in S_{\underline{d},\underline{x}}$ | $A(d_2, x_{4d}\|d_1 = 0, x_{3d}) =$ $\sqrt{P_{\underline{d}\|\underline{x}}(d_2\|x_{3d})}\delta(x_{4d}, x_{3d})$ |
| $\underline{d}_3$ | $d_3 \in S_{\underline{d}}$ | $\delta(d_3, d_2)$ |
| $\underline{x}_{1c}$ | $x_{1c} \in S_{\underline{x}}$ | $\delta(x_{1c}, 0)$ |
| $\underline{x}_{1d}$ | $x_{1d} \in S_{\underline{x}}$ | $\delta(x_{1d}, 0)$ |
| $\underline{x}_{3c}$ | $x_{3c} \in S_{\underline{x}}$ | $\delta(x_{3c}, x_{2c})$ |
| $\underline{x}_{3d}$ | $x_{3d} \in S_{\underline{x}}$ | $\delta(x_{3d}, x_{2d})$ |
| $\underline{x}_{5c}$ | $x_{5c} \in S_{\underline{x}}$ | $\delta(x_{5c}, x_{4c})$ |
| $\underline{x}_{5d}$ | $x_{5d} \in S_{\underline{x}}$ | $\delta(x_{5d}, x_{4d})$ |

Figure 7

$A(a_5, b_5, c_3, d_3, x_{5c}, x_{5d}) =$ $$= \sum \begin{cases} \sqrt{P_{\underline{a}}(a_2) P_{\underline{b}}(b_2) P_{\underline{x}|\underline{a},\underline{b}}(x_{2c}|a_3, b_3) P_{\underline{c}|\underline{x}}(c_2|x_{3c}) P_{\underline{d}|\underline{x}}(d_2|x_{3d})} \\ \theta(a_2 = a_3 = a_4 = a_5) \theta(b_2 = b_3 = b_4 = b_5) \\ \theta(x_{2c} = x_{3c} = x_{4c} = x_{5c}) \theta(x_{2d} = x_{3d} = x_{4d} = x_{5d}) \theta(x_{5c} = x_{5d}) \\ \theta(c_2 = c_3) \theta(d_2 = d_3) \\ \theta(a_1 = b_1 = c_1 = d_1 = x_{1c} = x_{1d} = 0) \end{cases}$$

$= \sqrt{P_{\underline{a}}(a_5) P_{\underline{b}}(b_5) P_{\underline{x}|\underline{a},\underline{b}}(x_{5c}|a_5, b_5) P_{\underline{c}|\underline{x}}(c_3|x_{5c}) P_{\underline{d}|\underline{x}}(d_3|x_{5d})} \theta(x_{5c} = x_{5d})$

Figure 8

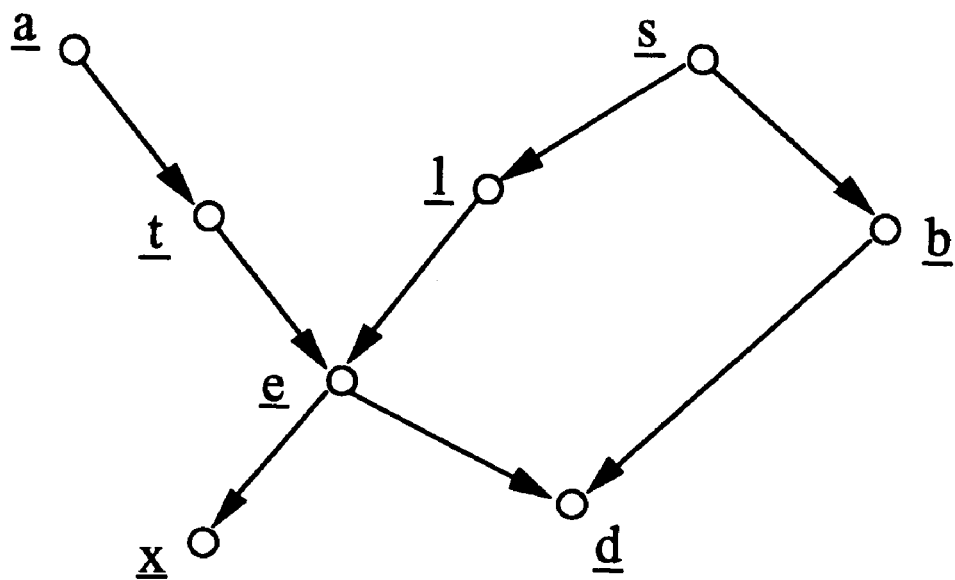

| nodes | states | probabilities | comments |
|---|---|---|---|
| $a$ | $a \in Bool$ | $P(a = 1) = .01$ | Visited Asia? |
| $b$ | $b \in Bool$ | $P(b = 1\|s = 1) = .60$ <br> $P(b = 1\|s = 0) = .30$ | Bronchitis? |
| $d$ | $d \in Bool$ | $P(d = 1\|e = 1, b = 1) = .90$ <br> $P(d = 1\|e = 1, b = 0) = .70$ <br> $P(d = 1\|e = 0, b = 1) = .80$ <br> $P(d = 1\|e = 0, b = 0) = .10$ | Dyspnea(trouble breathing)? |
| $e$ | $e \in Bool$ | $P(e\|l,t) = \delta(e, l \vee t)$ | Either TB or Lung Cancer? |
| $l$ | $l \in Bool$ | $P(l = 1\|s = 1) = .10$ <br> $P(l = 1\|s = 0) = .01$ | Lung Cancer? |
| $s$ | $s \in Bool$ | $P(s = 1) = .5$ | Smokes? |
| $t$ | $t \in Bool$ | $P(t = 1\|a = 1) = .05$ <br> $P(t = 1\|a = 0) = .01$ | Tuberculosis? |
| $x$ | $x \in Bool$ | $P(x = 1\|e = 1) = .98$ <br> $P(x = 1\|e = 0) = .05$ | Positive X-ray? |

Figure 10

| nodes | states | amplitudes |
|---|---|---|
| $\underline{a}_1$ | $a_1 \in Bool$ | $\delta(a_1, 0)$ |
| $\underline{a}_2$ | $a_2 \in Bool$ | $A(a_2|a_1 = 0) = \sqrt{P_{\underline{a}}(a_2)}$ |
| $\underline{a}_3$ | $a_3 \in Bool$ | $\delta(a_3, a_2)$ |
| $(\underline{a}_4, \underline{t}_2)$ | $(a_4, t_2) \in Bool^2$ | $A(a_4, t_2|a_3, t_1 = 0) = \sqrt{P_{\underline{t}|\underline{a}}(t_2|a_3)}\delta(a_4, a_3)$ |
| $\underline{a}_5$ | $a_5 \in Bool$ | $\delta(a_5, a_4)$ |
| $\underline{b}_1$ | $b_1 \in Bool$ | $\delta(b_1, 0)$ |
| $(\underline{b}_2, \underline{s}_{4b})$ | $(b_2, s_{4b}) \in Bool^2$ | $A(b_2, s_{4b}|b_1 = 0, s_{3b}) = \sqrt{P_{\underline{b}|\underline{s}}(b_2|s_{3b})}\delta(s_{4b}, s_{3b})$ |
| $\underline{b}_3$ | $b_3 \in Bool$ | $\delta(b_3, b_2)$ |
| $(\underline{b}_4, \underline{d}_2, \underline{e}_{4d})$ | $(b_4, d_2, e_{4d}) \in Bool^3$ | $A(b_4, d_2, e_{4d}|b_3, d_1 = 0, e_{3d}) =$ $\sqrt{P_{\underline{d}|\underline{b},\underline{e}}(d_2|b_3, e_{3d})}\delta(b_4, b_3)\delta(e_{4d}, e_{3d})$ |
| $\underline{b}_5$ | $b_5 \in Bool$ | $\delta(b_5, b_4)$ |
| $\underline{d}_1$ | $d_1 \in Bool$ | $\delta(d_1, 0)$ |
| $\underline{d}_3$ | $d_3 \in Bool$ | $\delta(d_3, d_2)$ |
| $\underline{e}_{1d}$ | $e_{1d} \in Bool$ | $\delta(e_{1d}, 0)$ |
| $\underline{e}_{1x}$ | $e_{1x} \in Bool$ | $\delta(e_{1x}, 0)$ |
| $(\underline{e}_{2d}, \underline{e}_{2x}, \underline{l}_4, \underline{t}_4)$ | $(e_{2d}, e_{2x}, l_4, t_4) \in Bool^4$ | $A(e_{2d}, e_{2x}, l_4, t_4|e_{1d} = 0, e_{1x} = 0, l_3, t_3) =$ $\sqrt{P_{\underline{e}|\underline{l},\underline{t}}(e_{2d}|l_3, t_3)}\delta(e_{2x}, e_{2d})\delta(l_4, l_3)\delta(t_4, t_3)$ |
| $\underline{e}_{3d}$ | $e_{3d} \in Bool$ | $\delta(e_{3d}, e_{2d})$ |
| $\underline{e}_{3x}$ | $e_{3x} \in Bool$ | $\delta(e_{3x}, e_{2x})$ |
| $(\underline{e}_{4x}, \underline{x}_2)$ | $(e_{4x}, x_2) \in Bool^2$ | $A(e_{4x}, x_2|e_{3x}, x_1 = 0) = \sqrt{P_{\underline{x}|\underline{e}}(x_2|e_{3x})}\delta(e_{4x}, e_{3x})$ |
| $\underline{e}_{5d}$ | $e_{5d} \in Bool$ | $\delta(e_{5d}, e_{4d})$ |
| $\underline{e}_{5x}$ | $e_{5x} \in Bool$ | $\delta(e_{5x}, e_{4x})$ |
| $\underline{l}_1$ | $l_1 \in Bool$ | $\delta(l_1, 0)$ |
| $(\underline{l}_2, \underline{s}_{4l})$ | $(l_2, s_{4l}) \in Bool^2$ | $A(l_2, s_{4l}|l_1 = 0, s_{3l}) = \sqrt{P_{\underline{l}|\underline{s}}(l_2|s_{3l})}\delta(s_{4l}, s_{3l})$ |
| $\underline{l}_3$ | $l_3 \in Bool$ | $\delta(l_3, l_2)$ |
| $\underline{l}_5$ | $l_5 \in Bool$ | $\delta(l_5, l_4)$ |
| $\underline{s}_{1b}$ | $s_{1b} \in Bool$ | $\delta(s_{1b}, 0)$ |
| $\underline{s}_{1l}$ | $s_{1l} \in Bool$ | $\delta(s_{1l}, 0)$ |
| $(\underline{s}_{2b}, \underline{s}_{2l})$ | $(s_{2b}, s_{2l}) \in Bool^2$ | $A(s_{2b}, s_{2l}|s_{1b} = 0, s_{1l} = 0) = \sqrt{P_{\underline{s}}(s_{2b})}\delta(s_{2l}, s_{2b})$ |
| $\underline{s}_{3b}$ | $s_{3b} \in Bool$ | $\delta(s_{3b}, e_{2b})$ |
| $\underline{s}_{3l}$ | $s_{3l} \in Bool$ | $\delta(s_{3l}, s_{2l})$ |
| $\underline{s}_{5b}$ | $s_{5b} \in Bool$ | $\delta(s_{5b}, s_{4b})$ |
| $\underline{s}_{5l}$ | $s_{5l} \in Bool$ | $\delta(s_{5l}, s_{4l})$ |
| $\underline{t}_1$ | $t_1 \in Bool$ | $\delta(t_1, 0)$ |
| $\underline{t}_3$ | $t_3 \in Bool$ | $\delta(t_3, t_2)$ |
| $\underline{t}_5$ | $t_5 \in Bool$ | $\delta(t_5, t_4)$ |
| $\underline{x}_1$ | $x_1 \in Bool$ | $\delta(x_1, 0)$ |
| $\underline{x}_3$ | $x_3 \in Bool$ | $\delta(x_3, x_2)$ |

| nodes | states | probabilities |
|---|---|---|
| $\underline{x}^i$ for all $i \in Z_{0,N_B-1}$ | $x^i \in Bool$ | $P(x^i)$ |
| $\underline{y}$ | $y \in Bool$ | $P(y|\vec{x})$ |

Figure 12

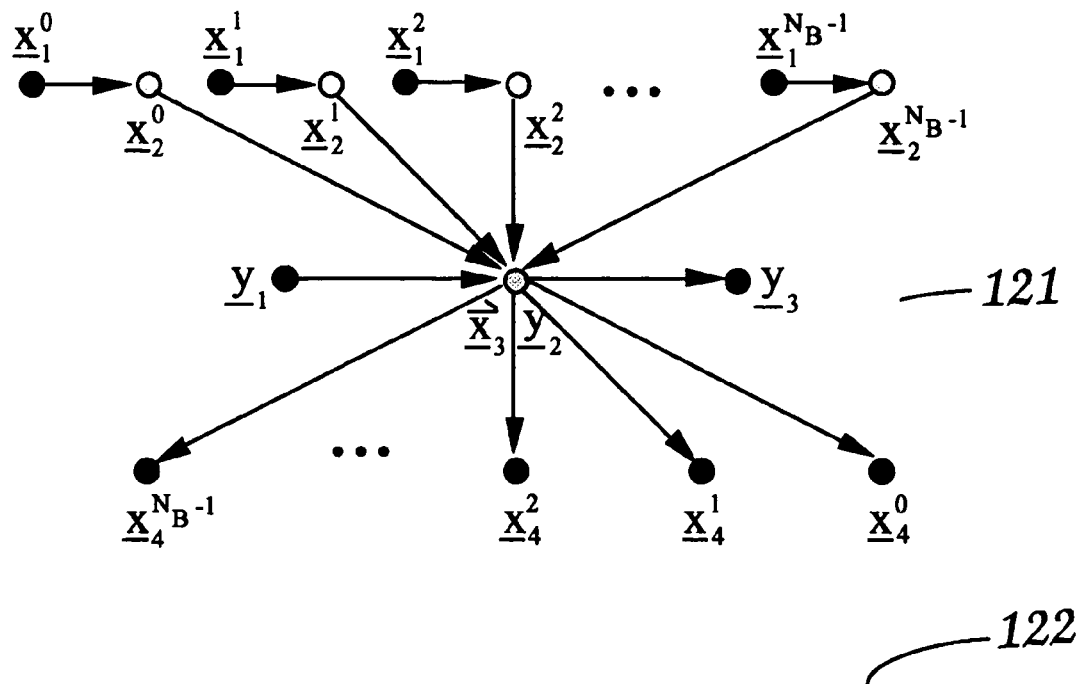

| nodes | states | amplitudes |
|---|---|---|
| $\vec{x}_1$ | $\vec{x}_1 \in Bool^{N_B}$ | $\delta(\vec{x}_1, 0)$ |
| $\vec{x}_2$ | $\vec{x}_2 \in Bool^{N_B}$ | $A(\vec{x}_2 \mid \vec{x}_1 = 0) = \sqrt{P_{\vec{x}}(\vec{x}_2)}$ |
| $(\vec{x}_3, \underline{y}_2)$ | $(\vec{x}_3, y_2) \in Bool^{N_B+1}$ | $A(\vec{x}_3, y_2 \mid \vec{x}_2, y_1 = 0) = \sqrt{P_{y\mid\vec{x}}(y_2\mid\vec{x}_2)}\delta(\vec{x}_3, \vec{x}_2)$ |
| $\vec{x}_4$ | $\vec{x}_4 \in Bool^{N_B}$ | $\delta(\vec{x}_4, \vec{x}_3)$ |
| $\underline{y}_1$ | $y_1 \in Bool$ | $\delta(y_1, 0)$ |
| $\underline{y}_3$ | $y_3 \in Bool$ | $\delta(y_3, y_2)$ |

$A(\vec{x}_4, y_3) =$
$= \sum \sqrt{P_{\vec{x}}(\vec{x}_2) P_{y\mid\vec{x}}(y_2\mid\vec{x}_2)} \theta(y_2 = y_3)\theta(\vec{x}_2 = \vec{x}_3 = \vec{x}_4)\theta(\vec{x}_1 = y_1 = 0)$ —123
$= \sqrt{P_{\vec{x}}(\vec{x}_4) P_{y\mid\vec{x}}(y_3\mid\vec{x}_4)}$

| | | | |
|---|---|---|---|
| # | | | |
| A | | | |
| a1 | | 0.707107 | 0 |
| a2 | | 0 | 0.707107 |
| # | | | |
| B | | | |
| b1 | | 0.707107 | 0 |
| b2 | | 0 | 0.707107 |
| # | | | |
| X | | | |
| B | b1 | | |
| A | a1 | | |
| x1 | | 1 | 0 |
| x2 | | 0 | 0 |
| B | b2 | | |
| A | a1 | | |
| x1 | | 0 | 0 |
| x2 | | 1 | 0 |
| B | b1 | | |
| A | a2 | | |
| x1 | | 0 | 1 |
| x2 | | 0 | 0 |
| B | b2 | | |
| A | a2 | | |
| x1 | | 0.707107 | 0 |
| x2 | | 0.707107 | 0 |

145

METHOD FOR PERFORMING CLASSICAL BAYESIAN NET CALCULATIONS USING A QUANTUM COMPUTER

CROSS REFERENCES TO RELATED APPLICATIONS

Not Applicable

STATEMENT REGARDING FEDERALLY SPONSORED RESEARCH AND DEVELOPMENT

Not Applicable

BACKGROUND OF THE INVENTION (A) Field of the Invention

The invention relates to an array of quantum bits (qubits) commonly known as a quantum computer. More specifically, it relates to methods for translating an input data-set into a sequence of operations that can be used to manipulate said array. The invention also relates to classical probabilistic networks (classical Bayesian nets) and their quantum counterparts.

(B) Description of Related Art

This invention deals with Quantum Computing. A quantum computer is an array of quantum bits (qubits) together with some hardware for manipulating these qubits. Quantum computers with several hundred qubits have not been built yet. However, once they are built, it is expected that they will perform certain calculations much faster that classical computers. A quantum computer can follow a sequence of elementary operations. The operations are elementary in the sense that they act on only a few qubits (usually 1, 2 or 3) at a time. Henceforth, we will sometimes refer to sequences as products and to operations as operators, instructions, steps or gates. Furthermore, we will abbreviate the phrase "sequence of elementary operations" by "SEO". SEOs are often represented as qubit circuits. In the quantum computing literature, the term "quantum algorithm" usually means a SEO for quantum computers for performing a desired calculation. Some quantum algorithms have become standard, such as those due to Deutsch-Jozsa, Shor and Grover. For a detailed discussion of quantum computing, see the books Gru99: J. Gruska, *Quantum Computing*, (Osborne McGraw-Hill, 1999), and NieChu00: M. Nielsen, I. Chuang, *Quantum Computation and Quantum Information*, (Cambridge University Press, 2000). Also, one can find on the Internet some excellent, free introductions to quantum computing.

This invention also deals with Classical Bayesian (CB) and Quantum Bayesian (QB) nets. (Most of the literature to date deals only with CB nets and refers to them simply as Bayesian nets (or networks), without the adjective "classical".)

A CB net comprises a graph (i.e., a diagram) and a matrix (with probabilities as entries) associated with each node of the graph. CB nets organize large amounts of probabilistic information and represent complicated probabilistic relationships. They do this in a way that is graphical, highly intuitive, and easily scalable. From the data contained within a CB net, one can derive many other conditional probabilities. Knowing such conditional probabilities is useful in applications of Decision Theory and Artificial Intelligence, wherein inferences are made based on uncertain knowledge. CB nets have been used in many areas, including pattern recognition, speech recognition, data mining, search engines, spam filters, expert systems, medical diagnosis, computer games with AI capabilities, etc. Companies which actively support the development and deployment of CB net technology include Microsoft, Intel, Google, etc. CB nets are also used in Defense (e.g., Star Wars missile discrimination). For a detailed discussion of CB nets, see the books Jen01: Finn V. Jensen, *Bayesian Networks and Decision Graphs* (Springer Verlag, 2001), and Pea88: Judea Pearl, *Probabilistic Reasoning in Intelligent Systems: Networks of Plausible Inference* (Morgan Kaufmann, Palo Alto, 1988). Also, one can find on the Internet some excellent, free introductions to CB nets.

QB nets are a generalization of CB nets to quantum mechanics. A QB net comprises a graph and a matrix (with complex numbers, called probability amplitudes or just amplitudes, as entries) associated with each node of the graph. QB nets have been proposed as a graphical method for analyzing the behavior of quantum systems, in QFogPat: U.S. Pat. No. 5,787,236 by R. R. Tucci. QB net diagrams may be viewed as an alternative to qubit circuits. For an introduction to QB nets, see QFogPat and Tuc99QIT: R. R. Tucci, "Quantum Information Theory—A Quantum Bayesian Nets Perspective", ArXiv eprint quant-ph/9909039.

The method proposed in this invention is based on an earlier method proposed by Fredkin-Toffoli (F-T) in Tof80: T. Toffoli, *Automata, Languages and Programming, 7th Coll.* (Springer Verlag, 1980) pg. 632, and in EreTof82: E. Fredkin, T. Toffoli, Int. Jour. of Th. Phys. (1982) Vol. 21, pg. 219. The F-T method is used in the field of (classical) reversible computing. F-T showed how, given any binary gate $f$ (i.e., a function $f: \{0,1\}^r \to \{0,1\}^s$, for some integers r, s), one can construct another binary gate $\tilde{f}$ such that $\tilde{f}$ can be used to perform the same calculations as $f$, but in a reversible manner. We will call $\tilde{f}$ a deterministic reversible extension (DRE) of $f$. Binary gates $f$ and $\tilde{f}$ can be represented as binary deterministic circuits. In this patent, we show how, given any CB net $K^C$, one can construct a QB net $K^Q$ which is a "q-embedding" of $K^C$. ("q-" stands for "quantum-") By running $K^Q$ on a quantum computer, one can calculate any conditional probability that one would be interested in calculating for the CB net $K^C$. Such conditional probabilities can be calculated with classical computers; the hope is that they can be calculated much faster with a quantum computer. Our method for constructing a q-embedding for a CB net is a generalization of the F-T method for constructing a DRE of a binary deterministic circuit. Thus, we generalize their method to the embedding of any classical stochastic circuit, not just binary deterministic ones.

Grover's algorithm is a quantum algorithm proposed in GroPat: U.S. Pat. No. 6,317,766, by Lov K. Grover. Our method of embedding a CB net $K^C$ within a QB net $K^Q$ can sometimes be used in combination with Grover's algorithm to great advantage. In certain cases, the target states that we wish to detect have probabilities that are too small to be measurable by running $K^Q$ on a quantum computer. However, we will show that sometimes one can construct a new QB net, call it $K^{Q'}$, that magnifies to measurable values the target probabilities that were unmeasurable using $K^Q$ alone. We will refer to $K^{Q'}$ as Grover's Microscope for $K^Q$, because $K^{Q'}$ is closely related to Grover's algorithm, and it magnifies some of the probabilities found with $K^Q$.

The independent claims of GroPat are 1 and 12. Claim 1 of GroPat refers to an "arrangement", presumably meaning quantum hardware such as a quantum computer. The claims of the present patent that pertain to Grover's algorithm require a classical computer that generates a sequence of operations; they do not require the actual application of said sequence of operations to a quantum computer. Claim 12 of GroPat refers to "A method for moving a quantum mechanical physical system which exists in a superposition of a plurality of states". Again, this seems to require quantum hardware to be manipulated according to the method. Even if it were judged that an embodiment of claim 12 of GroPat did not require quantum hardware, the present patent claims a Grover-like algorithm only if used as a post-processor to a special, classical computer program of which a preferred embodiment called "Q-Embedder" is described below.

A quantum compiler is a computer program that one runs on classical computers. It can "compile" a unitary matrix; i.e., it can express a unitary matrix as a SEO that a quantum computer can follow. An early type of quantum compiler is discussed in Bar95: A. Barenco, C. H. Bennett, R. Cleve, D. P. DiVincenzo, N. Margolus, P. Shor, T. Sleator, J. H. Smolin, H. Weinfurter, ArXiv eprint quant-ph/9503016. A different type of quantum compiler is discussed in QbtrPat: U.S. Pat. No. 6,456,994 B1, by R. R. Tucci, and in Tuc99Qbtr: R. R. Tucci, "A Rudimentary Quantum Compiler (2nd ed.)", ArXiv eprint quant-ph/9902062.

To run a QB net on a quantum computer, as is proposed in this invention, we need to translate the QB net into an equivalent SEO. This can be done with the help of a quantum compiler. A possible method of accomplishing this task is discussed in QbtrPat and in Tuc98: R. R. Tucci, "How to Compile a Quantum Bayesian Net", ArXiv eprint quant-ph/9805016. Thus, the method of this invention promises to be fertile ground for the use of quantum compilers.

A precursor to this invention was first published in TucV1: R. R. Tucci, "Quantum Computer as an Inference Engine", ArXiv eprint quant-ph/0004028 Version 1, submitted on 6 Apr. 2000. After TucV1 was published, Tucci realized that the method of TucV1 was flawed in some important respects. A new method, which is a substantial modification and correction of the method of TucV1, was published by Tucci in TucV2: R. R. Tucci, "Quantum Computer as a Probabilistic Inference Engine", ArXiv eprint quant-ph/0004028 Version 2, submitted on 19 Apr. 2004. We emphasize that TucV1 is now considered obsolete and flawed by Tucci. On the other hand, Tucci currently views TucV2 as essentially correct and in agreement with this invention. TucV1 and TucV2 differ as follows. Contrary to TucV2, TucV1 does not q-embed the root nodes of the CB net that it is trying to q-embed. More importantly, Section 6.3 of TucV1 incorrectly claims that calculating a conditional probability for a CB net $K^C$ using its q-embedding $K^Q$ requires measurements of all internal nodes of $K^Q$. TucV2 shows that only some of the external nodes of $K^Q$ need to be measured.

JaePat: U.S. Pat. No. 6,675,154, by G. S. Jaeger, proposes the use of a quantum computer for performing Fuzzy Logic. (Fuzzy Logic is a field that started with the paper Zad65: Lotfi Zadeh, "Fuzzy Sets", Information and Control Vol 8 (1965) pgs. 338-353). Although it might at first appear that there is some overlap between the claims of JaePat and those of the present patent, careful reflection shows that this is not the case. Indeed, the independent claims of JaePat are 1, 2, 6 and 11. Claim 1 of JaePat requires the use of F1: "at least one fuzzy proposition". Claim 2 of JaePat requires the use of F2: "fuzzy logic operations". Claims 6 and 11 both require "fuzzy control", which presumably requires F1 or F2. The claims of the present patent do not require F1 or F2. It is also of interest to note that many scientists and engineers are highly critical of Fuzzy Logic, and consider Bayesian Nets a far better method for dealing with situations involving uncertain knowledge.

To summarize, the present invention has the following advantages over prior art:

It merges ideas from various subjects (quantum computers, CB nets, QB nets, quantum compilers and Grover's algorithm) in a new way.

It generalizes ideas of F-T used in classical reversible computing.

It gives a method for performing CB net calculations on a quantum computer. Such calculations can be done on a classical computer. The hope is that they can be done much faster on a quantum computer.

It uses ideas from TucV2, and avoids mistakes of TucV1. TucV1 and TucV2 were both written by the inventor of this patent.

It shuns ideas from Fuzzy Logic in favor of Bayesian nets.

BRIEF SUMMARY OF THE INVENTION

A quantum computer is an array of quantum bits (qubits) together with some hardware for manipulating these qubits. A classical Bayesian (CB) net (or network) comprises a graph (i.e., a diagram) and a matrix (with probabilities as entries) associated with each node of the graph. A quantum Bayesian (QB) net comprises a graph and a matrix (with complex numbers, called probability amplitudes or just amplitudes, as entries) associated with each node of the graph.

A preferred embodiment of the invention comprises a classical computer that runs a special computer program. The program takes as input an initial data-set that contains probabilistic information and returns as output a sequence of elementary operations (SEO). The initial data-set helps determine a CB net $K^C$. A program called "Q-Embedder" q-embeds $K^C$ within a QB net $K^Q$. ("q-" stands for "quantum-"). A program called "Qubiter" then translates $K^Q$ into an equivalent SEO. Qubiter is an example of a type of program called a quantum compiler.

The SEO outputted by the classical computer can be used to manipulate an array of qubits in a quantum computer. Application of the SEO to the array, followed by a measurement of the array, yields the value of certain conditional probabilities that we wish to know.

A probability matrix is any matrix such that each column of the matrix constitutes a discrete probability distribution. Given a probability matrix P, this patent defines a unitary matrix U called a q-embedding of P. U carries all information contained in P. This patent describes a method for constructing one q-embedding U (out of many possible ones) for an arbitrary probability matrix P.

Given a CB net $K^C$, this patent defines a QB net $K^Q$ called a q-embedding of $K^C$. By running $K^Q$ on a quantum computer, one can calculate any conditional probability that one would be interested in calculating for the original CB net $K^C$. This patent describes a method for constructing one q-embedding $K^Q$ (out of many possible ones) for an arbitrary CB net $K^C$. The method involves replacing each node matrix of $K^C$ by a q-embedding. Doing this replacement of node matrices requires adding to the graph of $K^C$ new nodes called marginalizer and ancilla nodes.

This patent also shows how to use a version of Grover's algorithm in combination with Q-Embedder and Qubiter.

BRIEF DESCRIPTION OF THE DRAWINGS

FIG. 2 shows how to construct a q-embedding of an arbitrary probability matrix P(y|x). For definiteness, we assume in this figure that x∈{0, 1, 2} and y∈{0, 1, 2, 3}. Shaded columns can be filled using the Gram-Schmidt algorithm.

FIG. 4 shows a CB net (defined by a graph and a table of node probabilities) obtained by adding marginalizer nodes to the CB net of FIG. 3.

FIG. 6 shows, for the scattering QB net, a table of its node amplitudes.

FIG. 7 shows, for the scattering QB net, the probability amplitude of its external nodes.

FIG. 8 shows, for the lung-disease-diagnosis CB net, its graph, and a table of its node probabilities.

FIG. 10 shows, for the lung-disease-diagnosis QB net, a table of its node amplitudes.

FIG. 12 shows, for the voting QB net, its graph, a table of its node amplitudes and the amplitude of its external nodes.

FIG. 14 shows two boxes, each representing a text file. Together, these two text files fully specify a QB net.

Figure 1:
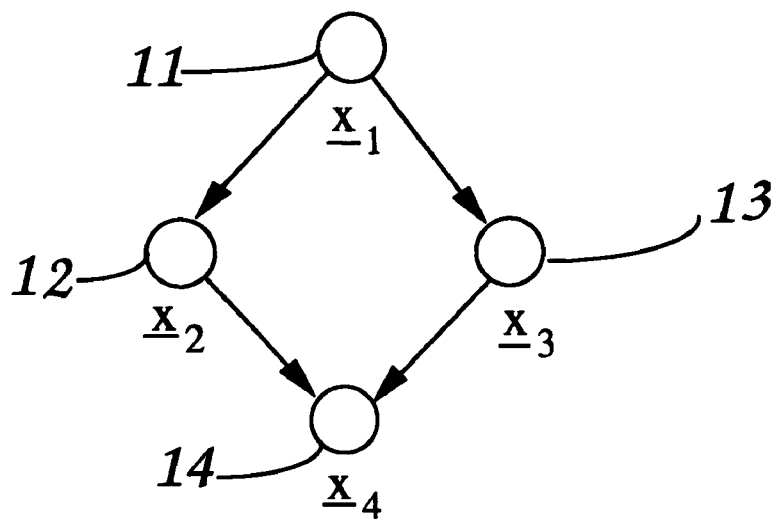
FIG. 1 shows a labelled graph and the four node matrices associated with the four nodes of the graph. The $A_j$ are complex amplitudes. This figure illustrates a QB net. Suppose we replaced $A_j$ everywhere in this figure by probabilities $P_j$. Then the figure would be an illustration of a CB net.

DETAILED DESCRIPTION OF THE INVENTION (A) Theory Behind New Method

Henceforth, we use the following notation.

We will use the word "ditto" as follows. If we say "A (ditto, X) is smaller than B (ditto, Y)", we mean "A is smaller than B" and "X is smaller than Y".

The prefix "q-" will to stand for "quantum-" (as in "q-embedding") and the prefix "c-" will stand for "classical-".

Let Bool={0, 1}. Let $Z_{a,b}$={a, a+1, a+2, . . . , b-1, b} for arbitrary integers a and b such that a≦b. For any finite set S, |S| will denote the cardinality of S (i.e., the number of elements in S).

δ(x, y) will denote the Kronecker delta function; it equals one if x=y and zero otherwise. For any statement St, we define the truth function θ(St) to equal 1 if St is true and 0 if St is false. For example, δ(x, y)=θ(x=y).

⊕ will denote addition mod 2. Suppose $\vec{x}$=(x_0, x_1, x_2, . . . )∈ Bool$^\infty$. We will call $$x = \sum_{\alpha=0}^{\infty} x_\alpha 2^\alpha$$

the decimal representation of $\vec{x}$ and denote it by dec($\vec{x}$).

We will use the symbol Σ. to denote a sum of whatever is on the right hand side of this symbol, where we sum over those indices with a dot underneath them. For example, $\Sigma.f(\dot{a})=\Sigma_a f(a)$ Suppose function $f$ maps set S into the complex numbers. We will use $f(x)/(\Sigma_x$ numerator) to represent $f(x)/(\Sigma_{x\in S} f(x))$. Thus, "numerator" stands for the numerator of the fraction.

Henceforth, we will either underline or put a caret over random variables. (ArXiv publications by Tucci (e.g., TucV2) indicate random variables by underlining them.) For example, P(â=a)=P_â(a) will denote the probability that the random variable â assumes value a. P(â=a) will often be abbreviated by P(a) when no confusion will arise. S_â will denote the set of values which the random variable â may assume, and N_â will denote the number of elements in S_â. pd(B|A) will stand for the set of probability distributions P(•|•) such that P(b|a)≧0 and $\Sigma_{b'\in B}P(b'|a)=1$ for all a∈A and b∈B.

$$H_1 = \begin{pmatrix} 1 & 1 \\ 1 & -1 \end{pmatrix}$$

is the one bit Hadamard matrix. $H_{N_B}=H_1^{xN_B}$ (the n-fold tensor product of $H_1$) is the $N_B$ bit Hadamard matrix.

Let $\vec{\kappa}=(\kappa_0, \kappa_1, \ldots, \kappa_{N_B-1})$ label $N_B$ bits. Assume all $\kappa_i$ are distinct. We will often use $N_S=2^{N_B}$, where $N_B$ stands for number of bits and $N_S$ for number of states. If$|\phi\rangle_{\kappa_i}=|\phi(\kappa_i)\rangle$ is a ket for qubit $\kappa_i$, define $|\phi\rangle_{\vec{\kappa}}=|\phi(\vec{\kappa})\rangle=\Pi_{i=0}^{N_B-1}|\phi)\kappa_i)\rangle$. For example, if $$|0\rangle_{\kappa_i} = \begin{pmatrix} 1 \\ 0 \end{pmatrix} \quad (1)$$

for all i, then $$|0\rangle_{\vec{\kappa}} = \prod_{i=0}^{N_B-1} |0\rangle_{\kappa_i} \quad (2)$$
$$= \begin{pmatrix} 1 \\ 0 \end{pmatrix} \otimes \begin{pmatrix} 1 \\ 0 \end{pmatrix} \otimes \ldots \otimes \begin{pmatrix} 1 \\ 0 \end{pmatrix}$$
$$= [1, 0, 0, \ldots, 0]^T.$$

Likewise, if $\Omega(\kappa_i)$ is an operator acting on qubit $\kappa_i$, define $$\Omega(\vec{\kappa}) = \prod_{i=0}^{N_B-1} \Omega(\kappa_i).$$

For example, $$H_1(\vec{\kappa}) = \prod_{i=0}^{N_B-1} H_1(\kappa_i)$$

is the $N_B$ bit Hadamard matrix.

Suppose $\phi$ is a normalized ($\phi^\dagger\phi=1$) complex vector. Define the projection and reflection operators for $\phi$ by $$\Pi_\phi = \phi\phi^\dagger, \quad R_\phi = 1 - 2\Pi_\phi. \tag{3}$$

Note that $\Pi_\phi^2 = \Pi_\phi$. If $x' = R_\phi x$, then $x'$ is the reflection of $x$ with respect to the plane perpendicular to $\phi$. For example, $R_\phi \phi = -\phi$.

Next we will present a brief review of CB and QB nets. For more information about CB nets see Jen01 or Pea88 or the internet. For more information about QB nets, see QFogPat or Tuc99QIT. First, we will discuss QB nets. Then we will point out how CB nets differ from QB nets.

We call a graph (or a diagram) a collection of nodes with arrows connecting some pairs of these nodes. The arrows of the graph must satisfy certain constraints. We call a labelled graph a graph whose nodes are labelled. A QB net consists of two parts: a labelled graph with each node labelled by a random variable, and a collection of node matrices, one matrix for each node. These two parts must satisfy certain constraints.

An internal arrow is an arrow that has a starting (source) node and a different ending (destination) one. We will use only internal arrows. We define two types of nodes: an internal or non-leaf node is a node that has one or more internal arrows leaving it, and an external or leaf node is a node that has no internal arrows leaving it. It is also common to use the terms root node or prior probability node for a node that has no incoming arrows (if any arrows touch it, they are outgoing ones).

We restrict our attention to acyclic graphs; that is, graphs that do not contain cycles. (A cycle is a closed path of arrows with the arrows all pointing in the same sense.)

We assign a random variable to each node of the QB net. Suppose the random variables assigned to the N nodes are $\hat{x}_1, \hat{x}_2, \ldots, \hat{x}_N$. For each $j \in Z_{1,N}$, the random variable $\hat{x}_j$ will be assumed to take on values within a finite set $S_j$ called the set of possible states of $\hat{x}_j$.

For example, consider the net of FIG. 1. Nodes 11, 12 and 13 are internal and node 14 is external. Node 11 is a root node. There are four nodes so N=4. We will assume that the four nodes must lie in one of two states: either no or si. Thus, $S_1 = S_2 = S_3 = S_4 = \{no, si\}$.

If $\Gamma = \{k_1, k_2, \ldots, k_{|\Gamma|}\} \subset Z_{1,N}$, and $k_1 < k_2 < \ldots < k_{|\Gamma|}$, define $(x.)_\Gamma = (x_{k_1}, x_{k_2}, \ldots, x_{k_{|\Gamma|}})$ and $(\hat{x}.)_\Gamma = (\hat{x}_{k_1}, \hat{x}_{k_2}, \ldots, \hat{x}_{k_{|\Gamma|}})$. Sometimes, we also abbreviate $(x.)_{Z_{1,N}}$ (i.e., the vector that includes all the possible $x_j$ components) by just $x.$, and $(\hat{x}.)_{Z_{1,N}}$ by just $\hat{x}.$.

For example, suppose N=4. One has $Z_{1,4} = \{1, 2, 3, 4\}$. If $\Gamma = \{1, 3\}$, then $|\Gamma|=2$. Furthermore, $(x.)_\Gamma = (x_1, x_3)$ and $(\hat{x}.)_\Gamma = (\hat{x}_1, \hat{x}_3)$. One defines $x. = (x.)_{Z_{1,4}} = (x_1, x_2, x_3, x_4)$ and $\hat{x}. = (\hat{x}.)_{Z_{1,4}} = (\hat{x}_1, \hat{x}_2, \hat{x}_3, \hat{x}_4)$.

Let $Z_{ext}$ be the set of all $j \in Z_{1,N}$ such that $\hat{x}_j$ is an external node, and let $Z_{int}$ be the set of all $j \in Z_{1,N}$ such that $\hat{x}_j$ is an internal node. Clearly, $Z_{ext}$ and $Z_{int}$ are disjoint and their union is $Z_{1,N}$.

For example, for FIG. 1, $Z_{ext} = \{4\}$ and $Z_{int} = \{1, 2, 3\}$.

Each possible value $x.$ of $\hat{x}.$ defines a different net story. For any net story $x.$, we call $(x.)_{Z_{int}}$ the internal state of the story and $(x.)_{Z_{ext}}$ its external state.

For example, a possible story for the net of FIG. 1 is the case when $\hat{x}_1 = \hat{x}_2 = si$ and $\hat{x}_3 = \hat{x}_4 = no$. This net story may also be represented by $\hat{x}. = (si, si, no, no)$. Since we are assuming that each of the four nodes of FIG. 1 can assume two states, there are total of $2^4 = 16$ stories possible for the net of FIG. 1. For story $\hat{x}. = (si, si, no, no)$, the internal state is $(x_1, x_2, x_3) = (si, si, no)$ and the external state is $x_4 = no$.

For each net story, we may assign an amplitude to each node. Define $\Gamma_j$ to be the set of all $k$ such that an arrow labelled $x_k$ (i.e., an arrow whose source node is $\hat{x}_k$) enters node $\hat{x}_j$. We say nodes $(\hat{x}.)_{\Gamma_j}$ are parents of node $\hat{x}_j$, and $\hat{x}_j$ is a child of nodes $(\hat{x}.)_{\Gamma_j}$. We assign a complex number $A_j[x_j|(x.)_{\Gamma_j}]$ to node $\hat{x}_j$. We call $A_j[x_j|(x.)_{\Gamma_j}]$ the amplitude of node $\hat{x}_j$ within net story $x.$.

For example, consider an arbitrary net story, call it $(x_1, x_2, x_3, x_4)$, of FIG. 1. No arrow enters node $\hat{x}_1$ so both $\Gamma_1$ and $(x.)_{\Gamma_1}$ are empty. Node $\hat{x}_2$ is entered by an arrow from node $\hat{x}_1$ so $\Gamma_2 = \{1\}$ and $(x.)_{\Gamma_2} = (x_1)$. Likewise, $\Gamma_3 = \{1\}$ and $(x.)_{\Gamma_3} = (x_1)$. Finally, $\Gamma_4 = \{2, 3\}$ and $(x.)_{\Gamma_4} = (x_2, x_3)$. We assign the complex number $A_1[x_1]$ to node $\hat{x}_1$, $A_2[x_2|x_1]$ to node $\hat{x}_2$, $A_3[x_3|x_1]$ to node $\hat{x}_3$, and $A_4[x_4|x_2, x_3]$ to node $\hat{x}_4$.

The amplitude of net story $x.$, call it $A(x.)$, is defined to be the product of all the node amplitudes $A_j[x_j|(x.)_{\Gamma_j}]$ for $j \in Z_{1,N}$. Thus, $$A(x.) = \prod_{j \in Z_{1,N}} A_j[x_j | (x.)_{\Gamma_j}]. \tag{4}$$

For example, consider an arbitrary net story, call it $(x_1, x_2, x_3, x_4)$, of FIG. 1. One has that $$A(x_1, x_2, x_3, x_4) = A_1[x_1]A_2[x_2|x_1]A_3[x_3|x_1]A_4[x_4|x_2, x_3]. \tag{5}$$

The function $A_j$ with values $A_j[x_j|(x.)_{\Gamma_j}]$ determines a matrix that we will call the node matrix of node $\hat{x}_j$, and denote by $Q_j$. $x_j$ is the matrix's row index and $(x.)_{\Gamma_j}$ is its column index.

For example, FIG. 1 gives the four node matrices $Q_1, Q_2, Q_3, Q_4$ associated with the four nodes of the graph shown there.

This concludes our brief review of QB nets. CB nets are the same a QB nets except that complex numbers (node amplitudes) $A_j[x_j|(x.)_{\Gamma_j}]$, are replaced by non-negative numbers (node probabilities) $P_j[x_j|(x.)_{\Gamma_j}]$. In analogy to Eq. (4), the probability of net story $x.$, call it $P(x.)$, is defined as $$P(x.) = \prod_{j \in Z_{1,N}} P_j[x_j | (x.)_{\Gamma_j}]. \tag{6}$$

Whereas the node amplitudes of a QB net satisfy (usually)

$$\sum_{x_j \in S_j} |A_j[x_j | (x.)_{\Gamma_j}]|^2 = 1, \tag{7}$$

the node probabilities of a CB net satisfy (usually)

$$\sum_{x_j \in S_j} P_j[x_j | (x.)_{\Gamma_j}] = 1. \tag{8}$$

(We say "usually" because sometimes it might be convenient to use un-normalized $P_j$ or $A_j$. Within the specification of this patent, we assume that node probabilities $P_j$ and node amplitudes $A_j$ are normalized. This should be interpreted as a preferred embodiment, not a necessity, of the invention.)

Refs.QbtrPat (see, for example, Eq. (20) of QbtrPat) and Tuc98 show that given any QB net, one can find a (non-unique) unitary matrix, call it $U_{net}$, and an initial state vector, call it $\Psi_0$, so that $U_{net}$ and $\Psi_0$ describe the state evolution for the situation captured by the QB net. One has $$\Psi = U_{net}\Psi_0, \quad (9)$$

where information about the root nodes of the QB net is encoded in the initial state vector $\Psi_0$, and information about the leaf nodes of the QB net is encoded in the final state vector $\Psi$.

Next we will define the q-embedding of a probability matrix and of a CB net.

A probability matrix $P(y|x)$ is a rectangular (not necessarily square) matrix with row index $y \in S_{\tilde{y}}$ and column index $x \in S_x$ such that $P(y|x) \geq 0$ for all x, y, and $\Sigma_y P(y|x) = 1$ for all x. The set of all probability matrices $P(y|x)$ where $x \in S_x$ and $y \in S_{\tilde{y}}$ will be denoted by $pd(S_{\tilde{y}}|S_x)$ (pd=probability distribution). A probability matrix is assigned to each node of a CB net. A probability matrix $P(y|x)$ is deterministic if for each column x, there exists a single row y, call it $f(x)$, such that $P(y|x) = \delta(f(x), y)$. Any map $f: S_x \to S_{\tilde{y}}$ uniquely specifies (and is uniquely specified) by the deterministic probability matrix P with matrix elements $P(y|x) = \delta(y, f(x))$ for all $x \in S_x$ and $y \in S_{\tilde{y}}$. We often talk about a map $f$ and its associated probability matrix $P(y|x)$ as if they were the same thing.

A unitary matrix $A(y, \tilde{x}|x, \tilde{y})$ (with rows labelled by y, $\tilde{x}$ and columns by x, $\tilde{y}$) is a q-embedding of probability matrix $P(y|x)$ if $$\sum_{\tilde{x}} |A(y, \tilde{x}|x, \tilde{y}=0)|^2 = P(y|x) \quad (10)$$

for all possible values of y and x. We say $\tilde{y}$ is a source index and $\tilde{x}$ is a sink index. We also refer to $\tilde{x}$ and $\tilde{y}$ collectively as ancilla indices. If a q-embedding satisfies $A(y, \tilde{x}|x, \tilde{y}) \in$ Bool for all y, $\tilde{x}$, x, $\tilde{y}$, we say that it is a deterministic q-embedding. Examples of the q-embedding of a probability matrix will be given below.

Given a QB net $K^Q$, let $$P[(x.)_L] = \left| \sum_{(x.)_{not(L)}} A(x.) \right|^2. \quad (11)$$

On the right hand side of Eq. (11), $A(x.)$ is the amplitude of story (x.), not(L)=$Z_Q$-L, where $Z_Q$ is the set of indices of all the nodes of $K^Q$, and L is the set of indices of all external (leaf) nodes of $K^Q$. In other words, not (L) is the set of internal (non-leaf) nodes of $K^Q$. We say $K^Q$ is a q-embedding of CB net $K^C$ if $P[(x.)_L]$ defined by Eq. (11) satisfies $$P[(x.)_{Z_C}] = \sum_{(x.)_{L_1}} P[(x.)_L], \quad (12)$$

where $L_1 \subset L$, and $Z_C$ is the set of indices of all nodes of $K^C$. Thus, the probability distribution associated with all nodes of $K^C$ can be obtained from the probability distribution associated with the external nodes of $K^Q$. Examples of the q-embedding of a CB net will be given below.

Next we will prove that any probability matrix has a q-embedding. Suppose that we are given a probability matrix $P(y|x)$ where $x \in S_x$ and $y \in S_{\tilde{y}}$. Let $N_x = |S_x|$ and $N_{\tilde{y}} = |S_{\tilde{y}}|$. Let $\xi^{(x)}$ for $x \in S_x$ be any orthonormal basis of the complex $N_x$ dimensional vector space. The components of $\xi^{(x)}$ will be denoted by $\xi_{\tilde{x}}^{(x)}$, where $\tilde{x} \in S_x$. If the $\xi^{(x)}$'s are the standard basis, then $\xi_{\tilde{x}}^{(x)} = \delta(x, \tilde{x})$. Define matrix A by $$A(y, \tilde{x}|x, \tilde{y}) = \begin{cases} \sqrt{P(y|x)}\, \xi_{\tilde{x}}^{(x)} & \text{if } \tilde{y} = 0 \\ \text{obtained by Gram-Schmidt method} & \text{if } \tilde{y} \neq 0 \end{cases} \quad (13)$$

To understand the last equation, consider FIG. 2. In that figure we have assumed for definiteness that $S_x = \{0, 1, 2\}$ and $S_{\tilde{y}} = \{0, 1, 2, 3\}$. The shaded (ditto, unshaded) columns have $\tilde{y} \neq 0$ (ditto, $\tilde{y} = 0$). It is easy to see that the unshaded columns are orthonormal because the vectors $\xi^{(x)}$ are orthonormal and $$\sum_y P(y|x) = 1.$$

Since the unshaded columns are orthonormal, one can use the Gram-Schmidt method to fill the shaded columns so that all the columns of A are orthonormal and therefore A is unitary. The Gram Schmidt method is covered in most Linear Algebra books. See, for example, the book NobDan88: B. Noble and J. W. Daniels, *Applied Linear Algebra*, Third Edition (Prentice Hall, 1988). Note that by virtue of Eq. (13), $$\sum_{\tilde{x}} |A(y, \tilde{x}|x, \tilde{y}=0)|^2 = \sum_{\tilde{x}} P(y|x) \xi_{\tilde{x}}^{(x)*} \xi_{\tilde{x}}^{(x)} \quad (14)$$
$$= P(y|x)$$

so that the A defined by Eq. (13) does indeed satisfy Eq. (10).

Note that the matrix A defined by Eq. (13) will have real entries if the $\xi^{(x)}$ basis is chosen to lie in the real $N_x$ dimensional vector space and the Gram-Schmidt process is carried out in that same space. Thus, one can always find a q-embedding A for a probability matrix such that A is not merely unitary, but also orthogonal. However, if A is destined to become a node matrix in a QB net, it may be counterproductive to constrain A to be real, since this constraint may cause SEO decompositions of A to be longer.

Note that the matrix A defined by Eq. (13) has dimensions $N_x N_{\tilde{y}} \times N_x N_{\tilde{y}}$. It is sometimes possible to find a smaller q-embedding of an $N_{\tilde{y}} \times N_x$ probability matrix $P(y|x)$. For example, suppose $$P(y|x_1, x_2) = \delta(y, x_1 \oplus x_2), \quad (15)$$

for y, $x_1$, $x_2 \in$ Bool. Then define $$A(y, e|x_1, x_2) = \frac{(-1)^{x_1 e}}{\sqrt{2}} \delta(y, x_1 \oplus x_2), \quad (16)$$

for y, e, $x_1$, $x_2 \in$ Bool. It is easy to check that matrix A is unitary. Furthermore, $$\sum_e |A(y, e | x_1, x_2)|^2 = \delta(y, x_1 \oplus x_2). \quad (17)$$

Next we will show that any CB net has a q-embedding. So far we've shown how to construct a q-embedding for any probability matrix. Remember that each node of a CB net $K^C$ has a probability matrix assigned to it. The main step in constructing a q-embedding of $K^C$ is to replace each node matrix of $K^C$ by a q-embedding of it.

Before describing our construction method, we need some definitions. We say a node $\hat{m}$ is a marginalizer node if it has a single input arrow and a single output arrow. Furthermore, the parent node of $\hat{m}$, call it $\hat{x}$, has states $x = (x_1, x_2, \ldots x_n)$, where $x_i \in S_{x_i}$ for each $i \in Z_{1,n}$. Furthermore, for some particular integer $i_0 \in Z_{1,n}$, the set of possible states of $\hat{m}$ is $$S_{\hat{m}} = S_{\hat{x}_{i_0}},$$

and the node matrix of $\hat{m}$ is $P[\hat{m}=m|\hat{x}=(x_1, x_2, \ldots, x_n)] = \delta(m, x_{i_0})$.

Let $K^C$ be a CB net for which we want to obtain a q-embedding. Our construction has two steps:

(Step 1) Add Marginalizer Nodes.

More specifically, replace $K^C$ by a modified CB net $K^C_{mod}$ obtained as follows. For each node $\hat{x}$ of $K^C$, add a marginalizer node between $\hat{x}$ and every child of $\hat{x}$. If $\hat{x}$ has no children, add a child to it.

Figure 3:
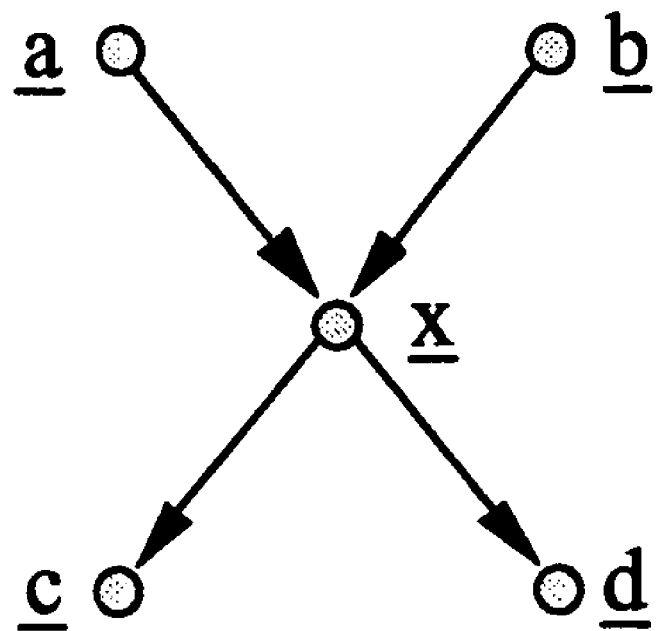
FIG. 3 shows a CB net for 2-body scattering. The figure includes the net's graph and a table of its node probabilities. We use this net to illustrate how one can construct a q-embedding of an arbitrary CB net.

As an example of this step, consider the net $K^C$ ("two body scattering net") defined by FIG. 3. FIG. 3 consists of two parts: a graph, and a table giving the probability matrices associated with each node of the graph.

Applying Step 1 to $K^C$ defined by FIG. 3 yields $K^C_{mod}$ defined by FIG. 4. Note that in FIG. 4, black circles denote all the marginalizer nodes added in Step 1, whereas white circles denote the original nodes of $K^C$.

(Step 2) Replace Node Probability Matrices by Their Q-Embeddings. Add Ancilla Nodes.

More specifically, replace $K^C_{mod}$ by a QB net $K^Q$ obtained as follows. For each node of $K^C_{mod}$, except for the marginalizer nodes that were added in the previous step, replace its node matrix by a new node matrix which is a q-embedding of the original node matrix. Add a new node for each ancilla index of each new node matrix. These new nodes will be called ancilla nodes (of either the source or sink kind) because they correspond to ancilla indices.

Figure 5:
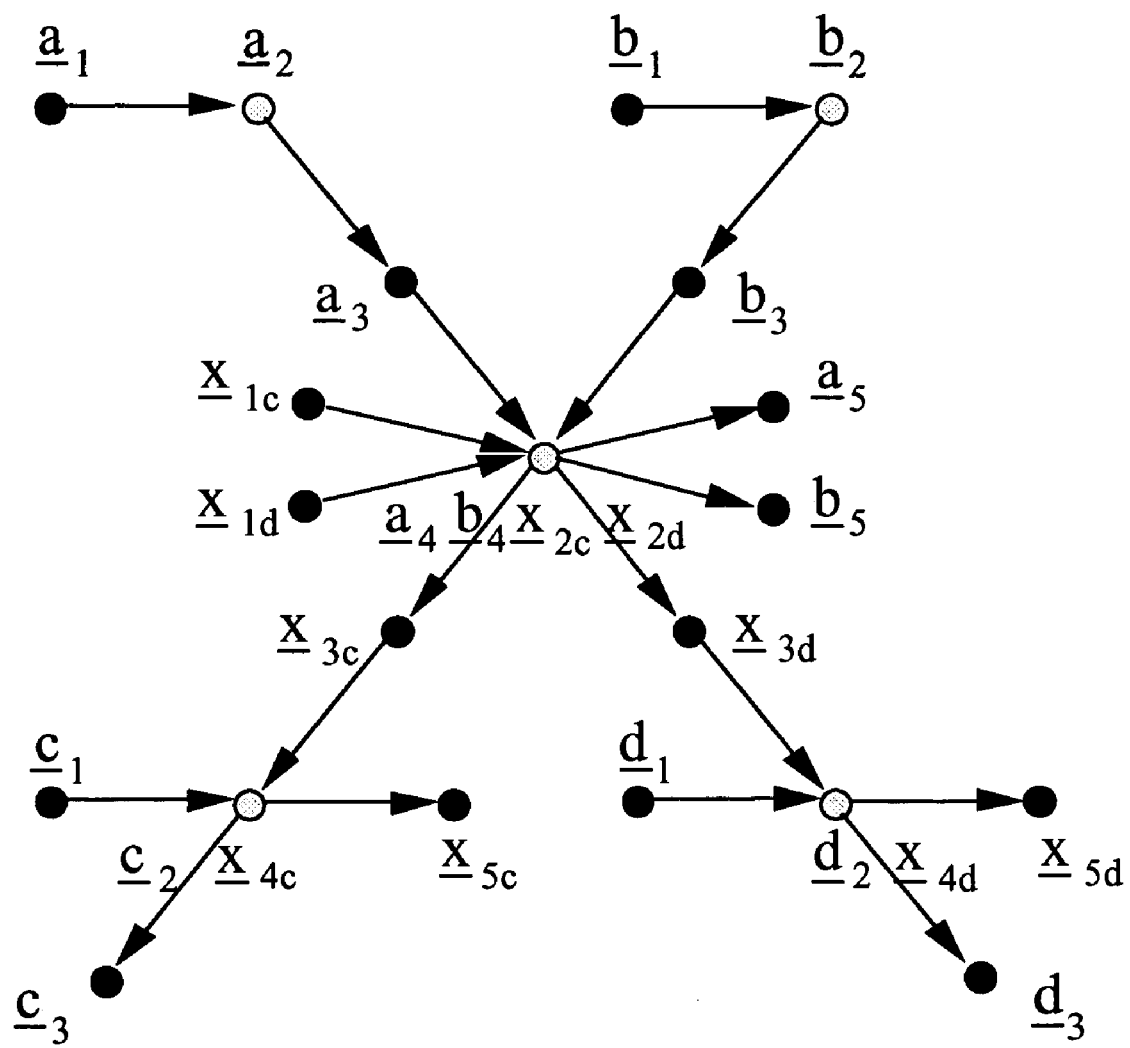
FIG. 5 shows, for the scattering QB net, its graph.

Applying Step 2 to net $K^C_{mod}$ for two body scattering yields $K^Q$ defined by the graph shown in FIG. 5 and the table of node amplitudes shown in FIG. 6. Note that in FIG. 5, black circles denote all the marginalizer and ancilla nodes added in Steps 1 and 2, whereas white circles denote the original nodes of $K^C$.

$K^Q$ looks much more complicated than $K^C$, but it really isn't, since most of its node matrices are delta functions which quickly disappear when summing over node states.

According to the table of FIG. 6, the probability amplitude for the external (aka leaf) nodes is given by the equation of FIG. 7, where we have summed over all internal (non-leaf) nodes. The equation of FIG. 7 shows that the net $K^Q$ that we constructed from the net $K^C$ by following Steps 1 and 2 satisfies the definition Eq. (12) that we gave earlier for a q-embedding of $K^C$. The probability distribution of the states of the external nodes of the QB net $K^Q$ contains all the probabilistic information of the original CB net $K^C$. Hurray!

The q-embedding of a CB net, as defined by Eq. (12), is not unique. For example, we could have defined the graph of FIG. 5 without the nodes $\hat{a}_3$ and $\hat{b}_3$. We chose to include such nodes for pedagogical reasons.

Figure 9:
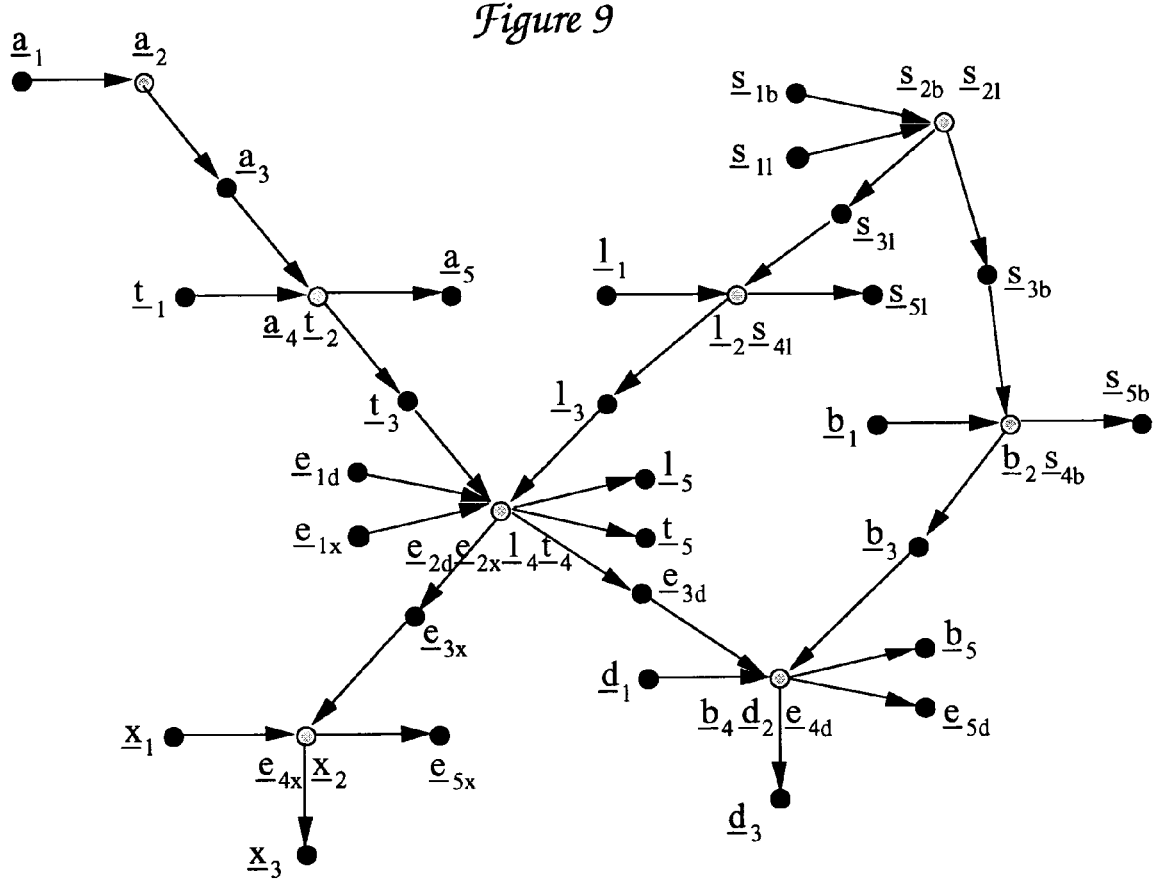
FIG. 9 shows, for the lung-disease-diagnosis QB net, its graph.

As another example of q-embedding a CB net, consider the CB net ("lung-disease-diagnosis net") defined by FIG. 8. The figure includes the net's graph and a table of its node probabilities. After applying Steps 1 and 2 to the CB net of FIG. 8, one obtains the QB net defined by the graph of FIG. 9 and the table of FIG. 10.

Next we will first present a CB net, call it $K^C$, that describes voting. Then we will find a QB net $K^Q$ that is a q-embedding of $K^C$. In certain cases, the target states that we wish to detect have probabilities that are too small to be measurable by running $K^Q$ on a quantum computer. However, we will show that sometimes one can construct a new QB net, call it $K^{Q'}$, that magnifies to measurable values the target probabilities that were unmeasurable using $K^Q$ alone. We will refer to $K^{Q'}$ as Grover's Microscope for $K^Q$, because $K^{Q'}$ is closely related to Grover's algorithm, and it magnifies some of the probabilities found with $K^Q$.

Suppose $y \in \text{Bool}$ and $\vec{x} = (x^0, x^1, \ldots, x^{N_B-1}) \in \text{Bool}^{N_B}$. Let $f: \text{Bool}^{N_B} \rightarrow \text{Bool}$.

We will say that $f$ is AND-like if $f(\vec{x}) = \theta(\vec{x} = \vec{x}_{targ})$ for some target vector $\vec{x}_{targ} \in \text{Bool}^{N_B}$. An AND-like $f$ maps all $\vec{x}$ into zero except for $\vec{x}_{targ}$ which it maps into one. Thus, $|f^{-1}(1)|=1$. An example of an AND-like $f$ is the multiple AND gate $f(\vec{x}) = x^0 \wedge x^1 \wedge \ldots \wedge x^{N_B-1}$, which can also be expressed as $f(\vec{x}) = \theta[\vec{x} = (1, 1, \ldots, 1)]$.

We will say that $f$ is OR-like if $f(\vec{x}) = \theta(\vec{x} \neq \vec{x}_{targ})$ for some target vector $\vec{x}_{targ} \in \text{Bool}^{N_B}$. An OR-like $f$ maps all $\vec{x}$ into one except for $\vec{x}_{targ}$ which it maps into zero. Thus, $|f^{-1}(0)|=1$. An example of an OR-like $f$ is the multiple OR gate $f(\vec{x}) = x^0 \vee x^1 \vee \ldots \vee x^{N_B-1}$, which can also be expressed as $f(\vec{x}) = \theta[\vec{x} \neq (0, 0, \ldots, 0)]$.

We will say that $f$ has a single target if it is either AND-like or OR-like. If $f$ has more than one target (i.e., if $|f^{-1}(0)|$ and $|f^{-1}(1)|$ are both greater than one), then we will say that $f$ has multiple targets.

Suppose $y \in \text{Bool}$ and $\vec{x} = (x^0, x^1, \ldots, x^{N_B-1}) \in \text{Bool}^{N_B}$. Consider the CB net ("voting net") defined by FIG. 11.

Henceforth, we will abbreviate $P(y=0|\vec{x}) = p_i$ and $P(y=1|\vec{x}) = q_i$, where $i = \text{dec}(\vec{x}) \in Z_{0,N_S-1}$. Hence $p_i + q_i = 1$ for all $i \in Z_{0,N_S-1}$. In general, the probability matrix $P(y|\vec{x})$ has $2^{N_B}$ free parameters (namely, $p_i$ for all $i \in Z_{0,N_S-1}$). This number of parameters is forbiddingly large for large $N_B$. To ease the task of specifying $P(y|\vec{x})$, it is common to impose additional constraints on $P(y|\vec{x})$. An interesting special type of $P(y|\vec{x})$ is deterministic $pd(\text{Bool}|\text{Bool}^{N_B})$ matrices; that is, those that can be expressed in the form $$P(y|\vec{x}) = \delta(y, f(\vec{x})), \quad (18)$$

where $f: \text{Bool}^{N_B} \rightarrow \text{Bool}$. In this case, the voting net can be used to pose the satisfiability problem (SAT): given $y=0$, find the most likely $\vec{x} \in \text{Bool}^{N_B}$; in other words, find those $\vec{x}$ for which $f(\vec{x})=0$. If $f$ is OR-like then all $p_i$ equal zero except for one $p_i$ which equals one. For example, for $N_B=2$, if $f$ is an OR gate, then $$P(y|\vec{x})_{OR} = \begin{pmatrix} 1 & 0 & 0 & 0 \\ 0 & 1 & 1 & 1 \end{pmatrix}, \quad (19)$$

where the row indices are $y=0, 1$ and the column indices are $\vec{x}=00, 01, 10, 11$ in that order. A slightly more general type of $P(y|\vec{x})$ is quasi-deterministic pd(Bool|Bool$^{N_B}$) matrices; that is, those that can be expressed in the form $$P(y|\vec{x}) = \sum_{\vec{t}} \delta(y, f(\vec{t})) P(t^0|x^0) P(t^1|x^1) \ldots P(t^{N_B-1}|x^{N_B-1}), \quad (20)$$

where $f: \text{Bool}^{N_B} \to \text{Bool}$ and we sum over all to $\vec{t}=(t^0, t^1, \ldots, t^{N_B-1})$ Bool$^{N_B}$. When $f(\vec{t})=t^0 \vee t^1 \vee \ldots \vee t^{N_B-1}$, $P(y|\vec{x})$ is called a noisy-OR. TucV2 discusses how to q-embed deterministic and quasi-deterministic pd(Bool|Bool$^{N_B}$) matrices, and how to express their q-embeddings as a SEO.

Figure 11:
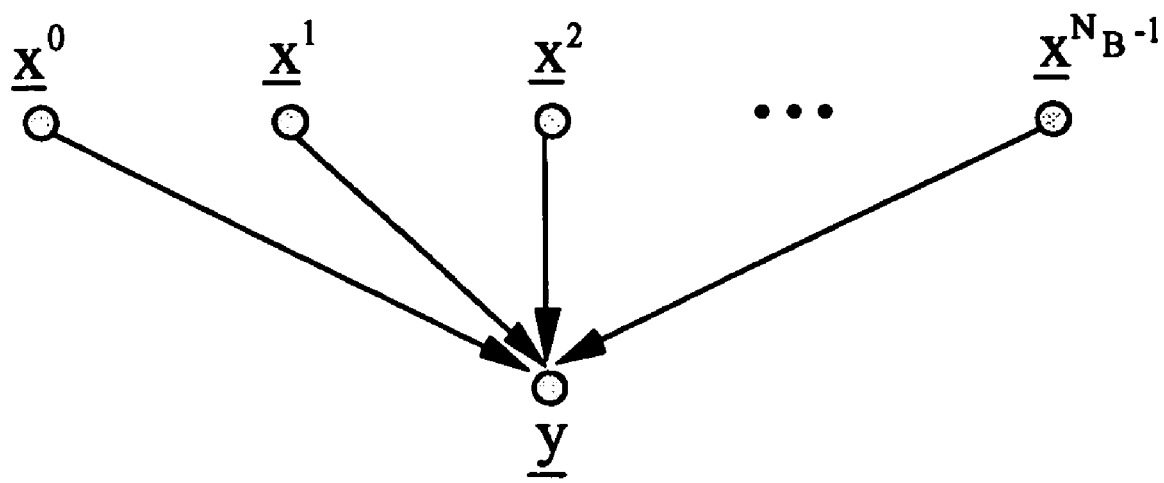
FIG. 11 shows, for the voting CB net, its graph and a table of its node probabilities.

A q-embedding for the CB net defined by FIG. 11 is given by the QB net defined by FIG. 12.

According to table 122 of FIG. 12, the probability amplitude for the external (leaf) nodes is given by equation 123 of FIG. 12.

To fully specify the QB net for voting, we need to extend $A(\vec{x}_2|\vec{x}_1=0)$ and $A(\vec{x}_3, y_2|\vec{x}_2, y_1=0)$ into unitary matrices by adding columns to them. This can always be accomplished by applying the Gram-Schmidt algorithm. But sometimes one can guess a matrix extension, and this makes application of the Gram-Schmidt method unnecessary. If $P(\vec{x})$ is uniform (i.e., $P(\vec{x})=1/N_S$ for all $\vec{x}$, which means there is no a priori information about $\vec{x}$), then $A(\vec{x}_2|\vec{x}_1=0)=1/\sqrt{N_S}$. In this case, we can extend $A(\vec{x}_2|\vec{x}_1=0)$ into the $N_B$ bit Hadamard matrix $H_{N^B}$:

$$[A(\vec{x}_2|\vec{x}_1)]=H_{N_B}/\sqrt{N_S}. \quad (21)$$

(This works because all entries of the first column of $H_{N_B}$ are equal to 1.) As to extending $A(\vec{x}_3, y_2|\vec{x}_2, y_1=0)$, this can be done as follows. Define $$\Delta_p = \text{diag}(\sqrt{p_0}, \sqrt{p_1}, \ldots, \sqrt{p_{N_S-1}}), \quad (22)$$

and $$\Delta_q = \text{diag}(\sqrt{q_0}, \sqrt{q_1}, \ldots, \sqrt{q_{N_S-1}}). \quad (23)$$

A possible way of extending $A(\vec{x}_3, y_2|\vec{x}_2, y_1=0)$ into a unitary matrix is $$[A(\vec{x}_3, y_2|\vec{x}_2, y_1)] = \begin{pmatrix} \Delta_p & -\Delta_q \\ \Delta_q & \Delta_p \end{pmatrix}. \quad (24)$$

Unitary matrices of this kind are called D-matrices in Qbtr-Pat. QbtrPat shows how to decompose any D-matrix into a SEO.

Next we will discuss Grover's Microscope for the voting QB net defined by FIG. 12. For simplicity, we will assume that $P(\vec{x})$ is uniform.

Let is $\vec{\kappa}=(\kappa_0, \kappa_1, \ldots, \kappa_{N_B-1})$ label $N_B$ bits and let $\tau$ label another bit. Assume that $\tau$ and all the $\kappa_i$ are distinct. Define $$\phi_p = (\sqrt{p_0}, \sqrt{p_1}, \ldots, \sqrt{p_{N_S-1}})^T, \quad (25)$$

$$\phi_q = (\sqrt{q_0}, \sqrt{q_1}, \ldots, \sqrt{q_{N_S-1}})^T, \quad (26)$$

and $$|\Psi\rangle = \Psi = \frac{1}{\sqrt{N_S}} \begin{pmatrix} \phi_p \\ \phi_q \end{pmatrix}. \quad (27)$$

Since $p_i+q_i=1$ for all $i$, $\phi_p^T\phi_p+\phi_q^T\phi_q=N_S$. According to equation 123 of FIG. 12, when $P(\vec{x})$ is uniform, the voting QB net fully specifies a unitary matrix $U_{net}$ such that $$|\Psi\rangle = U_{net}|0\rangle_{\vec{\kappa}}|0\rangle_{\tau}. \quad (28)$$

(The last equation is an example of Eq. (9).)

Define orthonormal vectors $e_0$ and $e_1$ by $$e_0 = \begin{pmatrix} \phi_p/|\phi_p| \\ 0 \end{pmatrix}, \quad e_1 = \begin{pmatrix} 0 \\ \phi_q/|\phi_q| \end{pmatrix}. \quad (29)$$

If $P(y|\vec{x})$ is deterministic with OR-like $f$, then all components of $e_0$ are zero except for the one at the target state $j_{targ}$.

$\Psi$ can be expressed in terms of $e_0, e_1$ as $$\Psi = \frac{1}{\sqrt{N_S}}(|\phi_p|e_0 + |\phi_q|e_1). \quad (30)$$

It is convenient to define a vector $\Psi_\perp$ orthogonal to $\Psi$:

$$\Psi_\perp = \frac{1}{\sqrt{N_S}}(|\phi_q|e_0 - |\phi_p|e_1). \quad (31)$$

If $P(y|\vec{x})$ is deterministic with OR-like $f$, then $|\phi_p|=1$ and $|\phi_q|=\sqrt{N_S-1}$ so, for large $N_S$, $\Psi \approx e_1$ and $\Psi_\perp \approx e_0$. For an arbitrary angle $\alpha$, let $$\Psi'_\perp = \frac{1}{\sqrt{N_S}} \left[ \left( c_{\frac{\alpha}{2}} |\phi_q| + s_{\frac{\alpha}{2}} |\phi_p| \right) e_0 + \left( s_{\frac{\alpha}{2}} |\phi_q| - c_{\frac{\alpha}{2}} |\phi_p| \right) e_1 \right], \quad (32)$$

where $s_A = \sin A$ and $c_A = \cos A$ for any angle A. Note that the angle between $\Psi'_\perp$ and $\Psi_\perp$ is $\alpha/2$. Call $\theta/2$ the angle between $e_1$ and $\Psi$.

Figure 13:
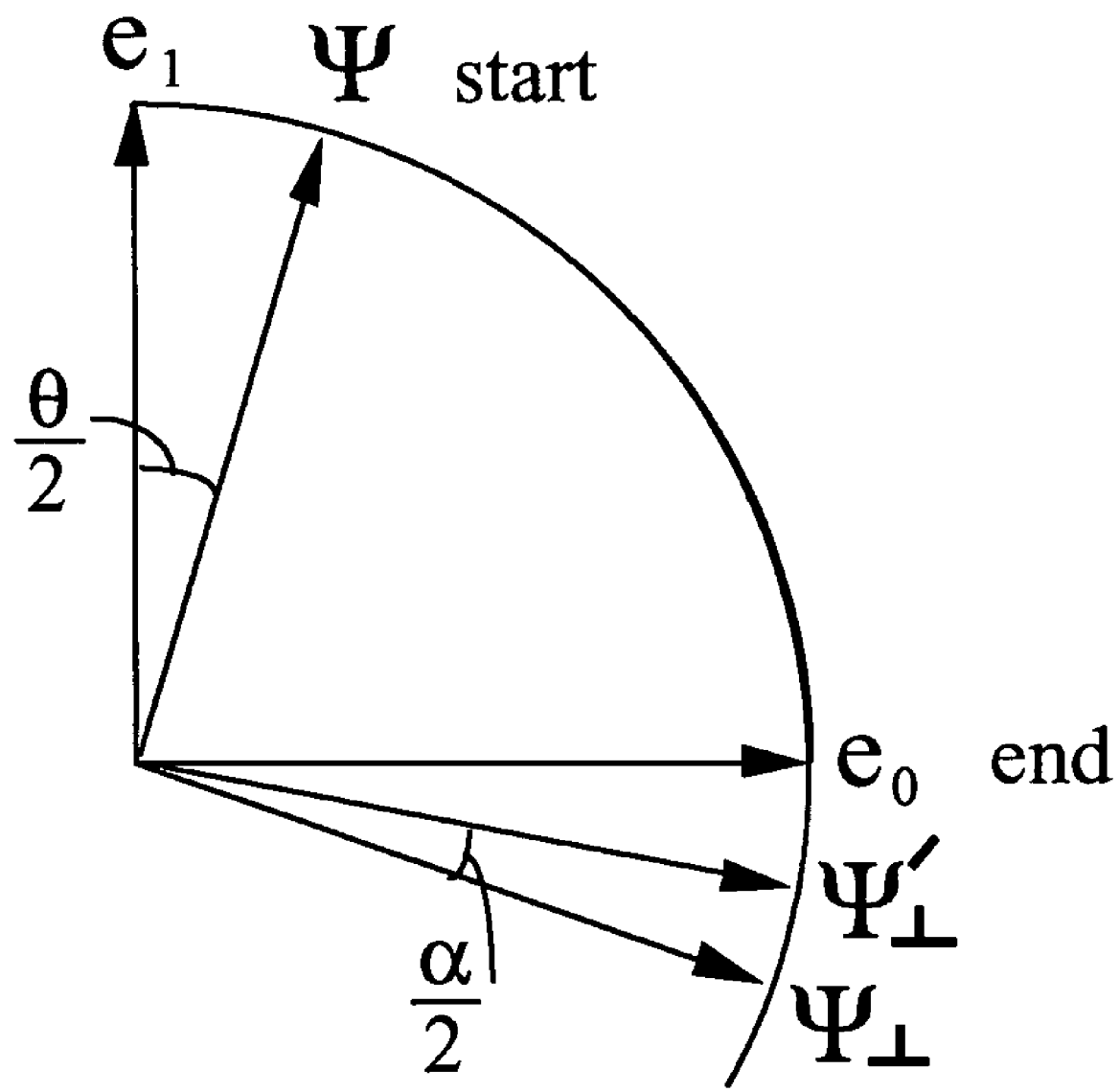
FIG. 13 shows various vectors relevant to the algorithm that we call "Grover's Microscope".

FIG. 13 portrays various vectors that arise in explaining Grover's Microscope. Note that $\Psi'_\perp = e_0$ when $\alpha = \theta$.

Since we plan to stay within the two dimensional vector space with orthonormal basis $e_0$, $e_1$, it is convenient to switch matrix representations. Within span($e_0$, $e_1$), $e_0$, $e_1$ can be represented more simply by:

$$e_0 = \begin{pmatrix} 1 \\ 0 \end{pmatrix}, \quad e_1 = \begin{pmatrix} 0 \\ 1 \end{pmatrix}. \quad (33)$$

If $e_0$, $e_1$ are represented in this way, then $$\Psi = \frac{1}{\sqrt{N_S}} \begin{pmatrix} |\phi_p| \\ |\phi_q| \end{pmatrix}, \quad (34)$$

$$\Psi_\perp = \frac{1}{\sqrt{N_S}} \begin{pmatrix} |\phi_q| \\ -|\phi_p| \end{pmatrix}, \quad (35)$$

and $$\Psi'_\perp = W \Psi, \quad (36)$$

where $$W = \begin{pmatrix} c_{\frac{\alpha}{2}} & -s_{\frac{\alpha}{2}} \\ s_{\frac{\alpha}{2}} & c_{\frac{\alpha}{2}} \end{pmatrix} \begin{pmatrix} 0 & 1 \\ -1 & 0 \end{pmatrix}. \quad (37)$$

The matrix $$\begin{pmatrix} 0 & 1 \\ -1 & 0 \end{pmatrix}$$

is a clockwise rotation by $\pi/2$ in space span($e_0$, $e_1$). Thus, W equals a clockwise rotation by $\pi/2$ followed by a counter-clockwise rotation by $\alpha/2$.

Define the following reflection operators $$R_0 = 1 - 2\Pi_{|0\rangle_\kappa} \Pi_{|0\rangle_\kappa^\dagger}, \quad (38)$$

$$R_\Psi = U_{net} R_0 U_{net}^\dagger, \quad (39)$$

$$R_{\Psi'_\perp} = W R_\Psi W^\dagger. \quad (40)$$

It follows that $$-R_\Psi R_{\Psi'_\perp} = c_\alpha \Psi \Psi^T - s_\alpha \Psi \Psi_\perp^T + s_\alpha \Psi_\perp \Psi^T + c_\alpha \Psi_\perp \Psi_\perp^T. \quad (41)$$

Thus, $-R_\Psi R_{\Psi'_\perp}$ rotates vectors in span($e_0$, $e_1$), clockwise by an angle $\alpha$.

Grover's Microscope can be summarized by the following equation $$(-R_{105} R_{\Psi'_\perp})^r \Psi \approx e_0, \quad (42)$$

for some integer r to be determined, where "≈" means approximation at large $N_S$. What this means is that our system starts in state $\Psi$ and is rotated consecutively r times, each time by a small angle $\alpha$, until it arrives at the state $e_0$. If $P(y|\vec{x})$ is deterministic with OR-like $f$, then measuring state $e_0$ yields the target state $j_{targ}$.

The optimum number r of iterations is $$r\alpha \approx \frac{\pi}{2}(1 + 2k) \quad (43)$$

for some integer k. Note that $\cos(\theta/2) = \langle \Psi | e_1 \rangle = |\phi_q|/\sqrt{N_S}$. Hence, in general, $\theta$ depends on $|\phi_p|$ (or on $|\phi_q| = \sqrt{N_S - |\phi_p|^2}$).

If $P(y|\vec{x})$ is deterministic with OR-like $f$, then $|\phi_p| = 1$ and $|\phi_q| = \sqrt{N_S - 1}$. In this case, it is convenient to choose $\alpha = \theta$, so that $\Psi'_\perp = e_0$. Then the optimum number r of iterations for Grover's original algorithm and for Grover's Microscope are equal. If we don't know ahead of time the value of $|\phi_p|$, then setting $\theta = \alpha$ will make both r and $\alpha$ depend on the unknown $|\phi_p|$, although the product $r\alpha$ will still be independent of it.

Let $$U_{Gscope} = \begin{pmatrix} 0 & 1 \\ -1 & 0 \end{pmatrix} \quad (44)$$
$$= -e_1 e_0^T + e_0 e_1^T$$
$$= -\psi \psi_\perp^T + \psi_\perp \psi^T.$$

Note that $$U_{Gscope} \Psi = \Psi_\perp. \quad (45)$$

From the point of view of quantum compiling, Grover's Microscope approximates the $\pi/2$ rotation $U_{Gscope}$ by the r-fold product of $-R_\Psi R_{\Psi'_\perp}$, where we assume that $-R_\Psi R_{\Psi'_\perp}$ can be shown to have a SEO of low (polynomial in $N_B$) complexity. (If such a low complexity SEO cannot be found, then it is pointless to divide $U_{Gscope}$ into r iterations of $-R_\Psi R_{\Psi'_\perp}$, and we might be better off compiling $U_{Gscope}$ all at once.)

(B) Computer Implementation of Theory

In Section (A), we described a mathematical algorithm for q-embedding any CB net within a QB net. Next we describe a particular implementation of this algorithm, a computer program called Q-Embedder that can be run on a classical computer.

To understand the input and output data of Q-Embedder, one must first understand the convention Q-Embedder uses for specifying CB and QB nets. Q-Embedder uses two text files to specify a QB net. An example is shown in FIG. 14. In this figure, boxes 140 and 145 each represents a text file.

From text file 140 we learn that the QB net has 3 nodes called A, B and X. We also learn the possible states of each node. For example, node A has two possible states, a1 and a2. The hash symbol in line 141 indicates that a new node will follow. Line 142 names the node A being considered. Lines 143 list the two possible states, a1, a2, of A.

From text file 145, we learn that nodes A, B, X are connected by two arrows: (1) from A to X, (2) from B to X. We also learn the node matrix for each of the nodes. For example, we learn that node A is a root node, and the amplitudes of its two states a1 and a2 are, respectively, 0.707+0i and 0+0.707i. Node X has four parent states: (B, A)=(b1, a1), (b2, a1), (b1, a2) and (b2, a2). For the parent state (B, A)=(b1, a1), the amplitudes of the two states x1 and x2 of X are, respectively, 1+0i and 0+0i. The hash symbol in line 146 indicates that a new parent state will follow. Line 147 names the node X being considered. Lines 148 give the parent state (B, A)=(b1, a1). Lines 149 give the amplitude of the states x1, x2.

There are many equivalent ways of specifying a QB net. In earlier examples, we specified a QB net by giving a graph (diagram) and a table specifying the amplitudes for each node. On the other hand, Q-Embedder specifies QB nets by means of two text files exemplified by FIG. 14.

To specify a CB net instead of a QB net, Q-Embedder also uses two text files, almost identical to those exemplified by FIG. 14. The only difference is that wherever QB net files list two real numbers separated by white space to represent a complex number (a node amplitude), CB net files list a single real number, from the interval [0,1], to represent a probability.

Now that we understand how Q-Embedder specifies CB nets and QB nets, it is easy to describe the input and output data for Q-Embedder. Q-Embedder takes as input two text files that specify a CB net $K^C$, and it returns as output two text files that specify a QB net $K^Q$ that is a q-embedding of $K^C$. For example, if the two input text files specify the CB net defined by FIG. 3, then the two output text files will specify that QB net defined by FIG. 5 and FIG. 6.

We will not present source code for Q-Embedder in this patent. Those skilled in the art of programming will find it a straightforward exercise to write a computer program like Q-Embedder that performs Steps 1 and 2. These steps were carefully described and illustrated with two detailed examples, two body scattering and lung disease diagnosis.

Next we will discuss how to combine Q-Embedder, Qubiter, and a quantum computer.

QbtrPat proposes a computer program for translating a QB net into an equivalent SEO. QbtrPat gives source code for a computer program called Qubiter-1.0 that can accomplish such translations partially, for two node QB nets. Then QbtrPat gives careful instructions on how to augment Qubiter-1.0 so that it can translate any QB net. Assume henceforth a computer program called Qubiter that can translate any QB net into a SEO.

Figure 16:
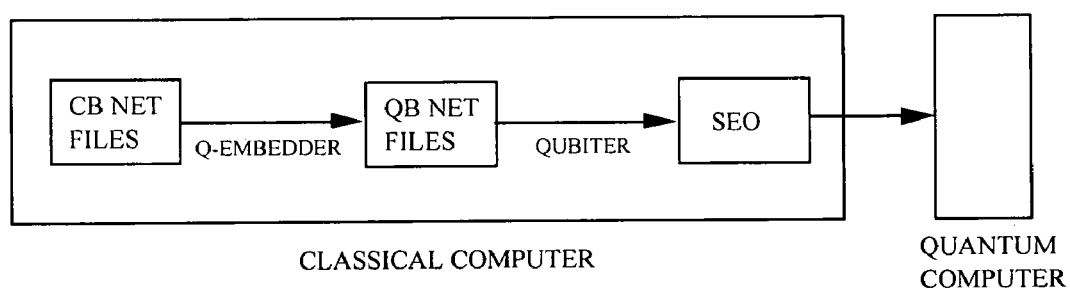
FIG. 16 shows another block diagram of a classical computer feeding data to a quantum computer.

Q-Embedder can be used in tandem with Qubiter. In such a configuration, Q-Embedder takes as input 2 text that specify a CB net, and it returns as output 2 text files that specify a QB net. Then Qubiter takes as input the 2 output files of Q-Embedder, and it returns as output an equivalent SEO. See FIG. 16.

Note that it may suffice to find a SEO that is only approximately (within a certain precision) equivalent instead of exactly equivalent to the QB net. This may be true if, for example, the probabilities associated with the CB net that was q-embedded were not specified too precisely to begin with.

A classical computer running Q-Embedder and Qubiter in tandem can feed the SEO produced by Qubiter to a quantum computer. See FIG. 16.

Figure 15:
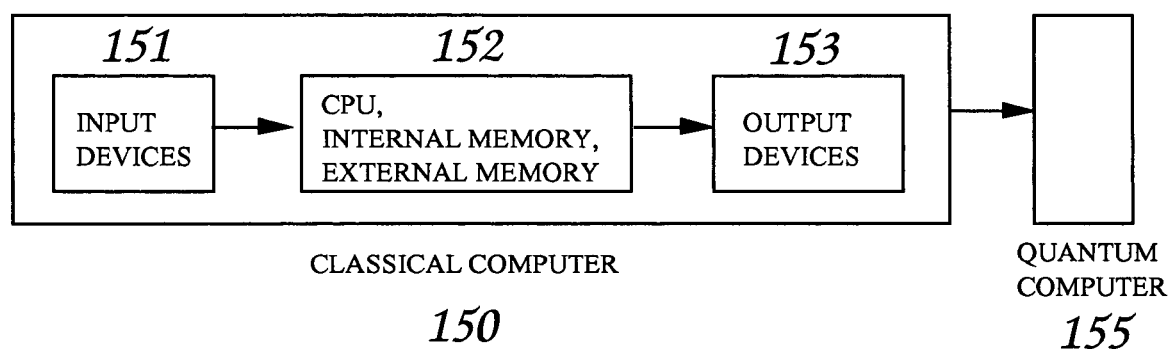
FIG. 15 shows a block diagram of a classical computer feeding data to a quantum computer.

FIG. 15 is a block diagram of a classical computer feeding data to a quantum computer. Box 150 represents a classical computer. It comprises sub-boxes 151, 152, 153. Box 151 represents input devices, such as a mouse or a keyboard. Box 152 represents the CPU, internal and external memory units. Box 152 does calculations and stores information. Box 153 represents output devices, such as a printer or a display screen. The graph (e.g., FIG. 3) of a CB net, or the graph (e.g., FIG. 5) of a QB net, can be rendered on the display screen. Box 155 represents a quantum computer, comprising an array of quantum bits and some hardware for manipulating the state of those bits. For more information about the organization of a present day classical computer, see CPP: J. Adams, S. Leestma, L. Nyhoff, "C++, an Introduction to Computing", (Prentice Hall, 1995) pages 19-20.

Next we describe how to calculate probabilities with a quantum computer. Consider the example of the CB net $K^C$ given by FIG. 3 and its q-embedding, the QB net $K^Q$ given by FIG. 5 and FIG. 6. From the equation of FIG. 7, it is clear that by running $K^Q$ on a quantum computer, we can calculate any conditional probability that one would want to calculate for $K^C$. For example, suppose we wanted to calculate $P_{\hat{a},d|x}$. Run $K^Q$ on the quantum computer several times, each time measuring nodes $\hat{a}_5$, $d_3$ and $\hat{x}_{5d}$ and not measuring all other external nodes. The resulting measurements will be distributed according to the probability distribution $P_{\hat{a},d,x}$. Nature will automatically take the magnitude squared of the amplitude $A(a_5, b_5, c_3, d_3, x_{5c}, x_{5d})$ and sum the result over the states of the un-measured external nodes. The laws of quantum mechanics guarantee it. Proceed in the same way to calculate $P_x$. Run $K^Q$ on the quantum computer several times, each time measuring node $\hat{x}_{5d}$ and not measuring all other external nodes. Finally divide $P_{\hat{a},d,x}$ by $P_x$ on a classical (or quantum) computer. This procedure works if we assign an integer number of qubits to each external node of $K^Q$, and if different external nodes are assigned different qubits. This way, when we say that we measured or did not measure an external node, we mean that we measured or did not measure the qubits assigned to that node. To implement this idea, it is convenient to extend the set of possible states of each node of $K^C$ so that the cardinality of the extended set equals a power of two. For example, for the CB net of FIG. 3, let $N_{\hat{a}}=|S_{\hat{a}}|$. Then let $$\overline{N}_{\hat{a}}=\min\{2^n: n\in Z_{0,\infty}, N_{\hat{a}}\leq 2^n\}. \qquad (46)$$

We extend $S_{\hat{a}}$ to a larger set $\overline{S}_{\hat{a}}$ which contains $S_{\hat{a}}$ and has $|\overline{S}_{\hat{a}}|=\overline{N}_{\hat{a}}$. We also define $P(a)=0$ for $a\in\overline{S}_{\hat{a}}-S_{\hat{a}}$. In an analogous way, we extend $S_b$, $S_x$, $S_{\hat{c}}$ and $S_d$ so that each has a cardinality which is a power of two. We also extend the functions $P(b)$, $P(x|a,b)$, $P(c|x)$ and $P(d|x)$ so that they take the same values on the old elements of the domain and vanish on the new ones.

Suppose samples $a_1, a_2, \ldots a_v$, belong to a finite set $S_{\hat{a}}$, and suppose that they are distributed according to a probability distribution $P_{\hat{a}}$. What number $v$ of samples $a_i$ is necessary to estimate $P_{\hat{a}}$ within a given precision? This question is directly relevant to our method for estimating probabilities by running a QB net on a quantum computer. We will not give a detailed answer to this question here. For an answer, the reader can consult any book on the mathematical theory of Statistics. An imprecise rule of thumb is that if the support of $P_{\hat{a}}$ has $v_0$ elements, then $v$ should be at least as large as $v_0$; i.e., one needs at least "one data point per bin" to estimate $P_{\hat{a}}$ with any decent accuracy.

We've explained how to estimate a conditional probability for a CB net by running a QB net $v$ times on a quantum computer. If we wanted to find $P(y|x^0, x^1)$ for the voting CB net, then the number of runs $v$ required to estimate $P(y|x^0, x^1)$ with moderate accuracy would not be too onerous, because the domain of $P(y|x^0, x^1)$ is $\text{Bool}^3$, which contains only 8 points. But what if we wanted to estimate $P(y|\vec{x})$? For large $N_B$, the domain of $P(y|\vec{x})$ is very large ($2^{N_B+1}$ points). If the support of $P(y|\vec{x})$ occupies a large fraction of this domain, then the number of runs ν required to estimate $P(y|\vec{x})$ with moderate accuracy is forbiddingly large. However, there are some cases in which "Grover's Microscope" can come to the rescue, by allowing us to amplify certain salient features of $P(y|\vec{x})$ so that they become measurable in only a few runs.

So far, we have described some exemplary preferred embodiments of this invention. Those skilled in the art will be able to come up with many modifications to the given embodiments without departing from the present invention. Thus, the inventor wishes that the scope of this invention be determined by the appended claims and their legal equivalents, rather than by the given embodiments.

What is claimed is:

1. A method of operating a classical computer to calculate a QB net data-set based on a CB net data-set, with the purpose of inducing a quantum computer to calculate a desired probability by operating said quantum computer in accordance with said QB net data-set, said method comprising the steps of:

storing said CB net data-set in said classical computer, wherein said CB net data-set comprises:

(a) c-graph information comprising a c-node label for each c-node of a plurality of N c-nodes, and also comprising a plurality of directed c-lines, wherein a directed c-line comprises an ordered pair of said c-node labels, wherein one member of the label pair labels the source c-node and the other member labels the destination c-node of the directed c-line, (b) c-state information comprising, for each $j \in \{1, 2, \ldots N\}$, a finite set $S_j$ containing labels for the states that the j'th c-node $\hat{x}_j$ assume, and (c) c-probability information comprising, for each $j \in \{1, 2, \ldots N\}$, a representation of a non-negative real number $$P_j[x_j \mid x_{k_1}, x_{k_2}, \ldots, x_{k_{|\Gamma_j|}}]$$

for each vector $$(x_j, (x.)_{\Gamma_j}) = (x_j, x_{k_1}, x_{k_2}, \ldots, x_{k_{|\Gamma_j|}})$$

such that $x_j \in S_j$, $x_{k_1} \in S_{k_1}$, $x_{k_2} \in S_{k_2}$, ..., and $$x_{k_{|\Gamma_j|}} \in S_{k_{|\Gamma_j|}},$$

wherein $$(\hat{x}_{k_1}, \hat{x}_{k_2}, \ldots, \hat{x}_{k_{|\Gamma_j|}})$$

is the set of all c-nodes for which there is a directed c-line with one element of the set as source c-node and $\hat{x}_j$ as destination c-node, wherein $|\Gamma_j| \geq 0$, composing said QB net data-set using said classical computer and said CB net data-set, wherein said QB net data-set comprises:

(a') q-graph information comprising a q-node label for each q-node of a plurality of N' q-nodes, and also comprising a plurality of directed q-lines, wherein a directed q-line comprises an ordered pair of said q-node labels, wherein one member of the label pair labels the source q-node and the other member labels the destination q-node of the directed q-line, (b') q-state information comprising, for each $j \in \{1, 2, \ldots N'\}$, a finite set $S'_j$ containing labels for the states that the j'th q-node $\hat{y}_j$ assumes, and (c') q-amplitude information comprising, for each $j \in \{1, 2, \ldots N'\}$, a representation of a complex number $$A_j[y_j \mid y_{k_1}, y_{k_2}, \ldots, y_{k_{|\Gamma'_j|}}]$$

for each vector $$(y_j, (y.)_{\Gamma'_j}) = (y_j, y_{k_1}, y_{k_2}, \ldots, y_{k_{|\Gamma'_j|}})$$

such that $y_j \in S'_j$, $y_{k_1} \in S'_{k_1}$, $y_{k_2} \in S'_{k_2}$, ..., and $$y_{k_{|\Gamma'_j|}} \in S'_{k_{|\Gamma'_j|}},$$

wherein $$(\hat{y}_{k_1}, \hat{y}_{k_2}, \ldots, \hat{y}_{k_{|\Gamma'_j|}})$$

is the set of all q-nodes for which there is a directed q-line with one element of the set as source q-node and $\hat{y}_j$ as destination q-node, wherein $|\Gamma'_j| \geq 0$, wherein if P(x.) is defined from said CB net data-set by $$P(x.) = \prod_{j=1}^{N} P_j[x_j \mid (x.)_{\Gamma_j}],$$

and A(y.) is defined from said QB net data-set by $$A(y.) = \prod_{j=1}^{N'} A_j[y_j \mid (y.)_{\Gamma'_j}],$$

then P(x.) for each $(x.) \in S_1 \times S_2 \times \ldots S_N$ is constrained to equal a function of A(y.) for all $(y.) \in S'_1 \times S'_2 \times \ldots S'_{N'}$, said function of A(y.) satisfying the following constraint, if L is the set of all j such that $\hat{y}_j$ is a leaf q-node (i.e., a q-node which is not a source q-node of any directed q-line) of said QB net data-set, and $$\text{not}(L) = \{1, 2, \ldots N'\} - L, \text{ and}$$

$$A_L[(y.)_L] = \sum_{(y.)_{\text{not}(L)}} A(y.),$$

then P(x.) is proportional, with an (x.)-independent proportionality constant, to a sum of some numbers from the set $\{|A_L[(y.)L]|^2$: for all possible values of $(y.)L\}$.

2. The method of claim 1, wherein said classical computer has a display screen, comprising the additional step of:
  displaying on said display screen a diagram of said c-graph information.

3. The method of claim 1, comprising the additional step of:
  calculating using said classical computer and said QB net data-set, a q-evolution data-set that specifies a unitary matrix $U_{net}$ and an initial state vector $\Psi_0$, wherein the evolution from said initial state vector $\Psi_0$ to the final state vector $\Psi = U_{net}\Psi_0$ describes the situation captured by said QB net data-set.

4. The method of claim 3, comprising the additional step of:
  calculating using said classical computer, a $U_{net}$-sequence of operations, wherein said $U_{net}$-sequence of operations and said $U_{net}$ both would, if applied to an array of qubits, produce equivalent transformations of the array.

5. The method of claim 4, wherein said $U_{net}$-sequence of operations comprises a sequence of elementary operations on qubits.

6. The method of claim 4, also utilizing a quantum computer, comprising the additional step of:
  manipulating said quantum computer largely according to said $U_{net}$-sequence of operations.

7. The method of claim 3, comprising the additional steps of:
  calculating using said classical computer, a microscope data-set that specifies a unitary matrix T, wherein if $\Psi = U_{net}\Psi_0$, and $\Psi' = T\Psi$, then a few components of $\Psi'$ have much larger magnitudes than all other components of $\Psi'$.

8. The method of claim 7, comprising the additional step of:
  calculating using said classical computer, a T-sequence of operations, wherein said T-sequence of operations and said T both would, if applied to an array of qubits, produce equivalent transformations of the array.

9. The method of claim 8, wherein said T-sequence of operations comprises a sequence of elementary operations on qubits.

10. A method of operating a classical computer to calculate a QB net data-set based on a CB net data-set, with the purpose of inducing a quantum computer to calculate a desired probability by operating said quantum computer in accordance with said QB net data-set, said method comprising the steps of:
  storing said CB net data-set in said classical computer, wherein said CB net data-set comprises:
    (a) c-graph information comprising a c-node label for each c-node of a plurality of N c-nodes, and for each c-node $\hat{x}_j$ where $j \in \{1, 2, \ldots, N\}$, an ordered set $(\hat{x}.)_{\Gamma_j}$ of c-nodes wherein $\Gamma_j \subset \{1, 2, \ldots, N\} - \{j\}$ and $|\Gamma_j| \geq 0$,
    (b) c-state information comprising, for each $j \in \{1, 2, \ldots N\}$, a finite set $S_j$ containing labels for the states that the j'th c-node $\hat{x}_j$ assumes, and
    (c) c-probability information comprising, for each $j \in \{1, 2, \ldots N\}$, a representation of a non-negative real number $P_j[x_j | (x.)_{\Gamma_j}]$ for each vector
    $$(x_j, (x.)_{\Gamma_j}) = (x_j, x_{k_1}, x_{k_2}, \ldots, x_{k_{|\Gamma_j|}})$$
    such that $x_j \in S_j$, $x_{k_1} \in S_{k_1}$, $x_{k_2} \in S_{k_2}$, ... and
    $$x_{k_{|\Gamma_j|}} \in S_{k_{|\Gamma_j|}},$$
  composing said QB net data-set using said classical computer and said CB net data-set, wherein said QB net data-set comprises:
    (a') q-graph information comprising a q-node label for each q-node of a plurality of N' q-nodes, and for each q-node $\hat{y}_j$ where $j \in \{1, 2, \ldots, N'\}$, an ordered set $(\hat{y}.)_{\Gamma'_j}$ of q-nodes wherein $\Gamma'_j \subset \{1, 2, \ldots, N'\} - \{j\}$ and $|\Gamma'_j| \geq 0$,
    (b') q-state information comprising, for each $j \in \{1, 2, \ldots N'\}$, a finite set $S'_j$ containing labels for the states that the j'th q-node $\hat{y}_j$ assumes, and
    (c') q-amplitude information comprising, for each $j \in \{1, 2, \ldots N'\}$, a representation of a complex number $A_j[y_j | (y.)_{\Gamma'_j}]$ for each vector
    $$(y_j, (y.)_{\Gamma'_j}) = (y_j, y_{k_1}, y_{k_2}, \ldots, y_{k_{|\Gamma'_j|}})$$
    such that $y_j \in S'_j$, $y_{k_1} \in S'_{k_1}$, $y_{k_2} \in S'_{k_2}$, ..., and
    $$y_{k_{|\Gamma'_j|}} \in S'_{k_{|\Gamma'_j|}},$$
  wherein if P(x.) is defined from said CB net data-set by
  $$P(x.) = \prod_{j=1}^{N} P_j[x_j | (x.)_{\Gamma_j}],$$
  and A(y.) is defined from said QB net data-set by
  $$A(y.) = \prod_{j=1}^{N'} A_j[y_j | (y.)_{\Gamma'_j}],$$
  then P(x.) for each $(x.) \in S_1 \times S_2 \times \ldots S_N$ is constrained to equal a function of A(y.) for all $(y.) \in S'_1 \times S'_2 \times \ldots S'_{N'}$, said function of A(y.) satisfying the following constraint, if $\text{not}(L) = \cup_{j=1}^{N'} \Gamma'_j$, and $L = \{1, 2, \ldots N'\} - \text{not}(L)$, and
  $$A_L[(y.)_L] = \sum_{(y.)_{\text{not}(L)}} A(y.),$$
  then P(x.) is proportional, with an (x.)-independent proportionality constant, to a sum of some numbers from the set $\{|A_L[(y.)_L]|^2 : \text{for all possible values of } (y.)_L\}$.

11. The method of claim 10, wherein said classical computer has a display screen, comprising the additional step of:
  displaying on said display screen a diagram of said c-graph information.

12. The method of claim 10, comprising the additional step of:
  calculating using said classical computer and said QB net data-set, a q-evolution data-set that specifies a unitary matrix $U_{net}$ and an initial state vector $\Psi_0$, wherein the evolution from said initial state vector $\Psi_0$ to the final state vector $\Psi = U_{net}\Psi_0$ describes the situation captured by said QB net data-set.

13. The method of claim 12, comprising the additional step of:
calculating using said classical computer, a $U_{net}$-sequence of operations, wherein said $U_{net}$-sequence of operations and said $U_{net}$ both would, if applied to an array of qubits, produce equivalent transformations of the array.

14. The method of claim 13, wherein said $U_{net}$-sequence of operations comprises a sequence of elementary operations on qubits.

15. The method of claim 13, also utilizing a quantum computer, comprising the additional step of:
manipulating said quantum computer largely according to said $U_{net}$-sequence of operations.

16. The method of claim 12, comprising the additional steps of:
calculating using said classical computer, a microscope data-set that specifies a unitary matrix T, wherein if $\Psi = U_{net}\Psi_0$, and $\Psi'' = T\Psi$, then a few components of $\Psi''$ have much larger magnitudes than all other components of $\Psi''$.

17. The method of claim 16, comprising the additional step of:
calculating using said classical computer, a T-sequence of operations, wherein said T-sequence of operations and said T both would, if applied to an array of qubits, produce equivalent transformations of the array.

18. The method of claim 17, wherein said T-sequence of operations comprises a sequence of elementary operations on qubits.

19. A method of operating a classical computer to calculate a q-evolution data-set based on a GB net data-set, with the purpose of inducing a quantum computer to calculate a desired probability by operating said quantum computer in accordance with said q-evolution data-set, said method comprising the steps of:
storing said GB net data-set in said classical computer, wherein said GB net data-set comprises:
(a) c-graph information comprising a c-node label for each c-node of a plurality of N c-nodes, and for each c-node $\hat{x}_j$ where $j \in \{1, 2, \ldots, N\}$, an ordered set $(\hat{x}.)_{\Gamma_j}$ of c-nodes wherein $\Gamma_j \subset \{1, 2, \ldots, N\} - \{j\}$ and $|\Gamma_j| \geq 0$,
(b) c-state information comprising, for each $j \in \{1, 2, \ldots N\}$, a finite set $S_j$ containing labels for the states that the j'th c-node $\hat{x}_j$ assumes, and
(c) c-probability information comprising, for each $j \in \{1, 2, \ldots N\}$, a representation of a non-negative real number $P_j[x_j|(x.)_{\Gamma_j}]$ for each vector $$(x_j, (x.)_{\Gamma_j}) = (x_j, x_{k_1}, x_{k_2}, \ldots, x_{k_{|\Gamma_j|}})$$

such that $x_j \in S_j$, $x_{k_1} \in S_{k_1}$, $x_{k_2} \in S_{k_2}$, ..., and $$x_{k_{|\Gamma_j|}} \in S_{k_{|\Gamma_j|}},$$

wherein, for each $j \in \{1, 2, \ldots N\}$, $\Sigma_{x_j \in S_j} P_j[x_j|(x.)_{\Gamma_j}]$ is independent of $(x.)_{\Gamma_j}$, composing said q-evolution data-set using said classical computer and said GB net data-set, wherein said q-evolution data-set specifies a unitary matrix $U_{net}$ and an initial state vector $\Psi_0$,
wherein if $$P(x) = \prod_{j=1}^{N} P_j[x_j|(x.)\Gamma_j],$$

then, for most or all $(x.) \in S_1 \times S_2 \times \ldots S_N$, said $P(x.)$ is a function of the components of the final state vector $\Psi = U_{net}\Psi_0$.

20. The method of claim 19, wherein if, for each $j \in \{1, 2, \ldots, N\}$, the c-node $\hat{x}_j$ and any c-node from the set $(\hat{x}.)\Gamma_j$ are said to be connected, then the connected c-nodes describe a directed acyclic graph.

21. The method of claim 19, wherein said classical computer has a display screen, comprising the additional step of:
displaying on said display screen a diagram of said c-graph information.

22. The method of claim 19, comprising the additional step of:
calculating using said classical computer, a $U_{net}$-sequence of operations, wherein said $U_{net}$-sequence of operations and said $U_{net}$ both would, if applied to an array of qubits, produce equivalent transformations of the array.

23. The method of claim 22, wherein said $U_{net}$-sequence of operations comprises a sequence of elementary operations on qubits.

24. The method of claim 22, also utilizing a quantum computer, comprising the additional step of:
manipulating said quantum computer largely according to said $U_{net}$-sequence of operations.

25. The method of claim 19, comprising the additional steps of:
calculating using said classical computer, a microscope data-set that specifies a unitary matrix T, wherein if $\Psi = U_{net}\Psi_0$, and $\Psi'' = T\Psi$, then a few components of $\Psi''$ have much larger magnitudes than all other components of $\Psi''$.

26. The method of claim 25, comprising the additional step of:
calculating using said classical computer, a T-sequence of operations, wherein said T-sequence of operations and said T both would, if applied to an array of qubits, produce equivalent transformations of the array.

27. The method of claim 26, wherein said T-sequence of operations comprises a sequence of elementary operations on qubits.

28. The method of claim 19, also utilizing a quantum computer with an array of qubits, comprising the additional steps of:
placing, one or more times, said array of qubits in a state described by said final state vector $\Psi$,
performing measurements on said array of qubits when its state is described by said final state vector $\Psi$,
estimating the value of $P(x.)$ for some $(x.) \in S_1 \times S_2 \times \ldots S_N$, from the outcome of said measurements.

* * * * *